United States Patent
Hubert et al.

(10) Patent No.: US 11,264,938 B2
(45) Date of Patent: Mar. 1, 2022

(54) RADIATIVE MICRON-GAP THERMOPHOTOVOLTAIC SYSTEM WITH TRANSPARENT EMITTER

(71) Applicant: MTPV POWER CORPORATION, Austin, TX (US)

(72) Inventors: Brian N. Hubert, Medford, MA (US); Bin Zhang, Malden, MA (US); Eric L. Brown, Cambridge, MA (US); Timothy R. Schuyler, Methuen, MA (US); David Mather, Austin, TX (US); Paul Greiff, Wayland, MA (US); Christopher W. Melanson, Rowley, MA (US); Bruno A. Nardelli, Watertown, MA (US); Shannon J. Kovar, Austin, TX (US); Trace W. Cody, Houston, TX (US)

(73) Assignee: MTPV POWER CORPORATION, Austin, TX (US)

( * ) Notice: Subject to any disclaimer, the term of this patent is extended or adjusted under 35 U.S.C. 154(b) by 414 days.

(21) Appl. No.: 15/428,067

(22) Filed: Feb. 8, 2017

(65) Prior Publication Data
US 2017/0229995 A1 Aug. 10, 2017

Related U.S. Application Data

(60) Provisional application No. 62/300,883, filed on Feb. 28, 2016, provisional application No. 62/292,622, filed on Feb. 8, 2016.

(51) Int. Cl.
*H02S 10/30* (2014.01)
*H01L 31/048* (2014.01)
*H02S 40/42* (2014.01)

(52) U.S. Cl.
CPC ............ *H02S 10/30* (2014.12); *H02S 40/425* (2014.12)

(58) Field of Classification Search
CPC ....................................................... H02S 10/30
See application file for complete search history.

(56) References Cited

U.S. PATENT DOCUMENTS

| | | |
|---|---|---|
| 3,325,703 A | 6/1967 | Rutz |
| 4,561,040 A | 12/1985 | Eastman et al. |

(Continued)

FOREIGN PATENT DOCUMENTS

| | | | |
|---|---|---|---|
| EP | 0779252 | 6/1997 | |
| WO | 063052 | 5/2008 | |
| WO | WO-2016182605 A1 * | 11/2016 | ............... G21B 3/00 |

OTHER PUBLICATIONS

U.S. Appl. No. 64/238,996, filed Jul. 23, 2002, Keegan, Kevin.
(Continued)

*Primary Examiner* — Sadie White
(74) *Attorney, Agent, or Firm* — Day Pitney LLP; George N. Chaclas

(57) ABSTRACT

A thermophotovoltaic panel assembly including a heat sink and a plurality of thermophotovoltaic modules mounted on the heat sink. Each thermophotovoltaic module includes a photovoltaic element separated from an emitter assembly by a gap. The emitter assembly includes an emitter and applies force towards the photovoltaic element to maintain the gap. The thermophotovoltaic panel assembly may also utilize a force application layer on the emitter and be bolted in place. A housing can be used for protection and to transfer energy to the emitter. The heat sink cantilevers into the housing to define a space between the thermophotovoltaic modules and the inner surface of the housing. Preferably, the housing maintains a vacuum and, in turn, the gap is evacuated. The (Continued)

heat sink can be monolithic and cooled with fluid pumped therethrough. The emitter may be transparent or at least partially transmissive.

12 Claims, 25 Drawing Sheets

(56) References Cited

U.S. PATENT DOCUMENTS

| | | | |
|---|---|---|---|
| 4,612,408 | A | 9/1986 | Moddel et al. |
| 4,743,302 | A | 5/1988 | Dumesnil et al. |
| 5,075,763 | A | 12/1991 | Spitzer et al. |
| 5,500,054 | A | 3/1996 | Goldstein |
| 5,593,509 | A | 1/1997 | Zuppero et al. |
| 5,611,870 | A | 3/1997 | Horne et al. |
| 5,932,029 | A * | 8/1999 | Stone ............... F24S 20/20 |
| | | | 136/253 |
| 5,998,240 | A | 12/1999 | Hamilton |
| 6,084,173 | A | 7/2000 | DiMatteo |
| 6,232,456 | B1 | 5/2001 | Cohen et al. |
| 6,232,546 | B1 * | 5/2001 | DiMatteo ............ H02S 10/30 |
| | | | 136/253 |
| 6,284,969 | B1 | 9/2001 | Fraas et al. |
| 6,441,297 | B1 | 8/2002 | Keller et al. |
| 6,538,193 | B1 * | 3/2003 | Fraas ............... C03B 5/235 |
| | | | 136/253 |
| 6,910,671 | B1 | 6/2005 | Norkus et al. |
| 7,056,566 | B2 | 6/2006 | Freuler et al. |
| 7,390,962 | B2 | 6/2008 | Greiff et al. |
| 7,513,659 | B2 | 4/2009 | Vukosic et al. |
| 7,755,184 | B2 | 7/2010 | Macris |
| 7,847,237 | B2 | 12/2010 | Fuyuki |
| 7,977,135 | B2 | 7/2011 | Greiff et al. |
| 8,013,238 | B2 | 9/2011 | Hockaday |
| 8,076,569 | B2 | 12/2011 | Greiff et al. |
| 8,479,778 | B2 | 7/2013 | Michael |
| 8,791,357 | B2 | 7/2014 | Brown et al. |
| 8,822,813 | B2 | 9/2014 | Greiff et al. |
| 9,065,006 | B2 | 6/2015 | Greiff et al. |
| 2003/0227732 | A1 * | 12/2003 | Dessiatoun ........ H01L 23/427 |
| | | | 361/103 |
| 2004/0231717 | A1 * | 11/2004 | Greiff ............... H02S 10/30 |
| | | | 136/253 |
| 2004/0261840 | A1 | 12/2004 | Schmit et al. |
| 2005/0109386 | A1 | 5/2005 | Marshall |
| 2005/0196321 | A1 | 9/2005 | Huang |
| 2006/0016471 | A1 * | 1/2006 | Greiff ............... H02S 10/30 |
| | | | 136/253 |
| 2007/0215325 | A1 | 9/2007 | Solovitz et al. |
| 2009/0101206 | A1 | 4/2009 | Diklich |
| 2009/0277488 | A1 * | 11/2009 | Greiff ............... H01L 31/024 |
| | | | 136/200 |
| 2010/0019619 | A1 * | 1/2010 | Hagg ............... H01J 45/00 |
| | | | 310/306 |
| 2011/0067752 | A1 | 3/2011 | Fafard |
| 2011/0168234 | A1 | 7/2011 | Lasich et al. |
| 2011/0315195 | A1 * | 12/2011 | Brown ............... H01L 31/052 |
| | | | 136/246 |
| 2013/0074906 | A1 * | 3/2013 | Siskavich ............ H02S 10/30 |
| | | | 136/246 |
| 2013/0092212 | A1 * | 4/2013 | Greiff ............... H02S 10/30 |
| | | | 136/246 |
| 2014/0261644 | A1 | 9/2014 | Brown |
| 2016/0181502 | A1 | 6/2016 | Savelli et al. |
| 2018/0159459 | A1 * | 6/2018 | Mills ............... G21B 3/00 |

OTHER PUBLICATIONS

International Search Report for PCT/US2017/017037 dated Jun. 8, 2017, 9pgs.
DiMatteo et al., "Micron-Gap ThermoPhotoVoltaics (MTPV)", 2003 AIP Conf. Proc 653, 232.
Lammert, M.D.; Schwartz, R.J., "The Interdigitated Back Contact Solar Cell: A Silocon Solar Cell for Use in Concentrated Sunlight Electron Devices", IEEE Transactions on Electron Devices, vol. 24, Issue 4; Publication Year 1977 (USA), pp. 337-342.
"Solar Cells", vol. 6. Issue 1; Publication Year 1982, (USA), pp. 17-38.
Susan L. Murray et al., "Effect of Metal Coverage on the Performance of .6 eV INGaAs Monolithic Interconncected Modules Fifth conference on Thermophotovoltaic Generation of Electricity", American Institute of Physics Conference Proceedings, Publication Year 2002 (Rome, Italy) vol. 853, pp. 424-433.

* cited by examiner

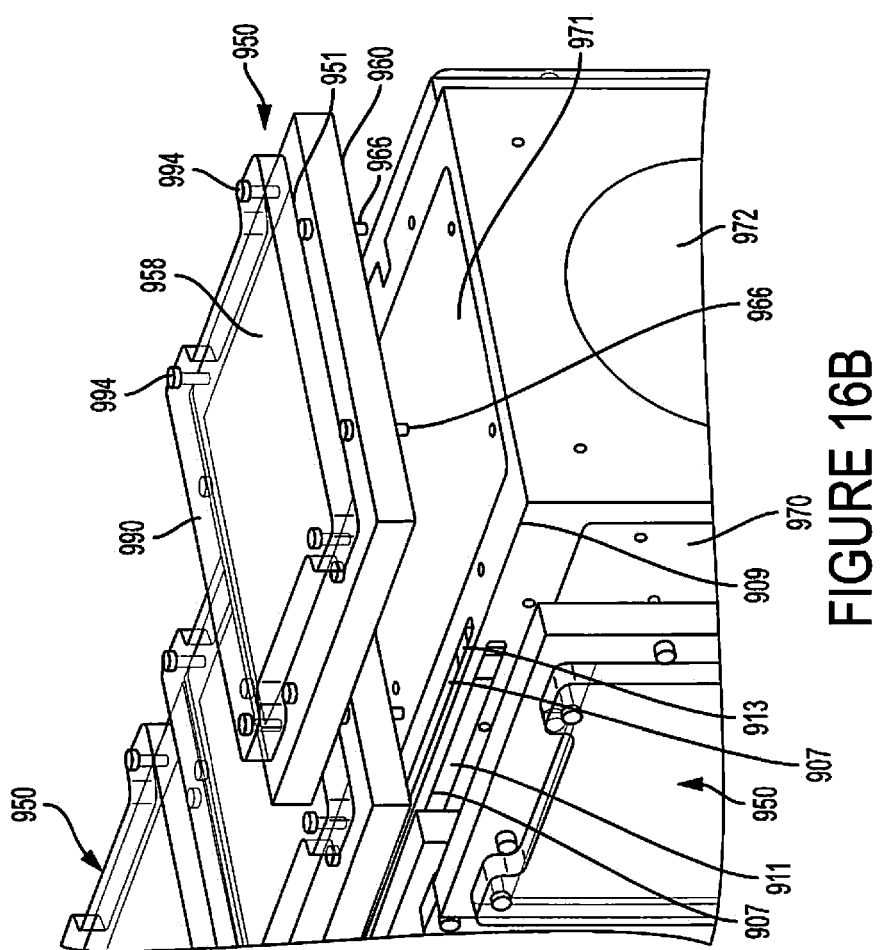

RADIATIVE MICRON-GAP THERMOPHOTOVOLTAIC SYSTEM WITH TRANSPARENT EMITTER

CROSS-REFERENCE TO RELATED APPLICATION

This application claims priority to U.S. Provisional Patent Application No. 62/292,622, filed Feb. 8, 2016 and U.S. Provisional Patent Application No. 62/300,883, filed Feb. 28, 2016, each of which is incorporated herein by reference.

BACKGROUND OF THE INVENTION

1. Field of the Invention

The subject technology relates to energy conversion and, particularly, to radiative micron-gap thermophotovoltaic modules with integrated pressure application to maintain the micron-gap.

2. Background of the Related Art

Technology has been driven to improve upon energy usage and generation in all aspects. Everyone will benefit from super efficient technology and design for power generation. To that end, breakthrough technology has been developed to convert heat into power. For example, a micron-gap thermophotovoltaic large scale sub-micron gap method and apparatus is shown in U.S. Pat. No. 8,791,357 to Brown et al. issued on Jul. 29, 2014. The technology of U.S. Pat. No. 8,791,357 is an energy conversion system leveraging near-field thermophotovoltaic (PV) cells with conductive transfer of energy from a hot housing to an emitter through direct physical contact between the emitter and housing by way of a thermal interface material. Additional examples of near-field thermal PV cells are shown in U.S. Pat. No. 6,232,546 to DiMatteo et al. issued on May 15, 2001 and U.S. Patent Application PGPUB No. 2009/0277488 to Greiff et al. published on Nov. 12, 2009 (now issued U.S. Pat. No. 8,076,569).

SUMMARY OF THE INVENTION

The subject technology is widely applicable to various energy conversion systems such as thermoelectric or quantum dot energy harvesting systems, thermionic emission, far field gap energy conversion, photovoltaic and other types of energy conversion now known and later developed. Although described below with respect to thermophotovoltaic energy conversion for illustration, one of ordinary skill in the art would understand the broad application of the subject technology. It is a benefit of the subject technology to be able to harvest and produce energy using a solid state system. The solid state system includes an emitter spaced apart from a photovoltaic element. Radiative energy transferred from the housing to the emitter is converted into electric energy. In one embodiment, the subject technology is directed to a thermophotovoltaic panel assembly including a heat sink. At least one thermophotovoltaic module mounts on the heat sink. Each thermophotovoltaic module includes an emitter assembly, a photovoltaic assembly separated from the emitter assembly by a gap, and a fastener applying a force to maintain the gap. Preferably, the gap is a sub-micron gap. The emitter can be fastened to the heat sink or a force application layer mounted on the emitter can couple to the heat sink. A base substrate between the photovoltaic assembly and the heat sink can also couple to the fastener for applying the force. The base substrate can be selected to have excellent thermal conductivity properties. Additionally, the base substrate may be treated or have layers added thereto for improving the thermal interface properties. The thermophotovoltaic panel assembly may also have a housing having an inner surface defining an interior, wherein the heat sink is cantilevered into the interior to define a space between the at least one thermophotovoltaic module and the inner surface. The housing typically maintains a vacuum and, in turn, the gap is evacuated. The typical vacuum level is about 0.1 to 10 millitorr. The heat sink may be monolithic or composed of several portions to define passages for receiving a cooling fluid pumped therethrough. At least one spacer, usually a plurality, on either the photovoltaic element and/or emitter can maintain the gap.

Another embodiment of the subject technology is directed to a thermophotovoltaic panel assembly including a housing having an inner surface defining an interior having a heat sink therein. At least one thermophotovoltaic module couples to the heat sink and has a photovoltaic element assembly separated from an emitter assembly by a gap. The at least one thermophotovoltaic module and inner surface define a space therebetween so that the housing absorbs energy and, thereby, radiates energy to the emitter assembly, and the emitter assembly absorbs energy and, in turn, emits energy across the gap for conversion into electricity by the photovoltaic element assembly. In one embodiment, the heat sink is cantilevered into the housing. Alternatively, one or more thermally insulating elements can surround or project from the heat sink to prevent contact between the thermophotovoltaic module and the heat sink.

Still another embodiment of the subject technology includes a thermophotovoltaic panel assembly including a housing having an inner surface defining an interior with a heat sink therein. One or more thermophotovoltaic modules couple to the heat sink. The interior includes a space between the thermophotovoltaic module(s) and the inner surface so that energy radiated by the housing and/or coming into the housing radiates to the thermophotovoltaic module(s) and, in turn, the thermophotovoltaic module(s) absorbs energy to generate electricity. The thermophotovoltaic module(s) may include an emitter assembly, a photovoltaic assembly separated from the emitter assembly by a gap, and a fastener applying a force to maintain the gap. For improved thermal conduction capacity and/or structural support, a base substrate can be between the photovoltaic assembly and the heat sink.

Yet another embodiment of the subject technology is directed to a micron-gap thermophotovoltaic panel assembly including a heat sink and at least one thermophotovoltaic module mounted on the heat sink. The thermophotovoltaic module includes a photovoltaic element separated from an emitter assembly by a micron-gap. The emitter assembly includes an emitter and applies force towards the photovoltaic element to maintain the micron-gap. Preferably, the emitter bolts, screws, and/or clamps to the heat sink. The micron-gap thermophotovoltaic panel assembly may also utilize a force application layer mounted on the emitter and bolted to the heat sink. The force application layer can be integral with the emitter or the emitter itself.

A housing can be used for protection and to transfer energy to the emitter. The heat sink may be cantilevered into the housing to define a space between the at least one thermophotovoltaic module and the inner surface. Preferably, the housing maintains a vacuum and, in turn, the micron-gap is evacuated. The heat sink can be monolithic and cooled with fluid pumped therethrough. At least one spacer may be between the photovoltaic element and emitter element to maintain the micron-gap. The thermophotovoltaic module can include a thermal interface layer between the photovoltaic element and the heat sink.

Another embodiment of the subject technology is directed to a micron-gap thermophotovoltaic panel assembly including a housing having an inner surface defining an interior. A heat sink is cantilevered into the interior. At least one thermophotovoltaic module mounts on the heat sink. The at least one thermophotovoltaic module includes a photovoltaic element separated from an emitter by a micron-gap. The at least one thermophotovoltaic module and inner surface define a space therebetween so that the housing absorbs energy and, thereby, radiates energy to the emitter. The emitter absorbs energy and, in turn, emits energy across the micron-gap for conversion into electricity by the photovoltaic element. The emitter may also apply force towards the photovoltaic element for maintaining the micron-gap. For example, the emitter is bolted to the heat sink. Alternatively, a force application layer mounts on the emitter and is bolted to the heat sink.

Still another embodiment of the subject technology is directed to a micron-gap thermophotovoltaic panel assembly including a housing having an inner surface defining an interior. A heat sink is cantilevered into the interior. At least one thermophotovoltaic module mounts on the heat sink. The at least one thermophotovoltaic module includes a photovoltaic element separated from an emitter by a micron-gap. The interior includes a space between the at least one thermophotovoltaic module and the inner surface so that energy coming into the housing radiates to the emitter. As a result, the emitter absorbs energy to thereby emit the energy across the micron-gap for conversion into electricity by the photovoltaic element.

It should be appreciated that an alternative energy conversion assembly can benefit from all or part of the subject technology. For example without limitation, a thermoelectric or quantum dot energy harvesting system could utilize the subject technology. It should also be appreciated that the subject technology can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be made to the following drawings.

FIG. 16B is a partially exploded view of the distal end of the micron-gap thermophotovoltaic panel assembly of FIG. 16A.

DETAILED DESCRIPTION OF PREFERRED EMBODIMENTS

The subject technology overcomes many of the prior art problems associated with energy conversion assemblies. Although the following description relates to micron-gap thermophotovoltaic assemblies for illustration, the subject technology is equally applicable to other approaches such as quantum dot energy harvesting systems, thermionic emission assemblies, far field assemblies such as far field photovoltaics, solar cells and the like.

The advantages, and other features of the technology disclosed herein, will become more readily apparent to those having ordinary skill in the art from the following detailed description of certain preferred embodiments taken in conjunction with the drawings which set forth representative embodiments of the present technology. The following description is with respect to the figures only, and terms like upward, downward, left and right are not to be construed in a limiting manner, as orientation of the subject technology is variable.

Figure 1:
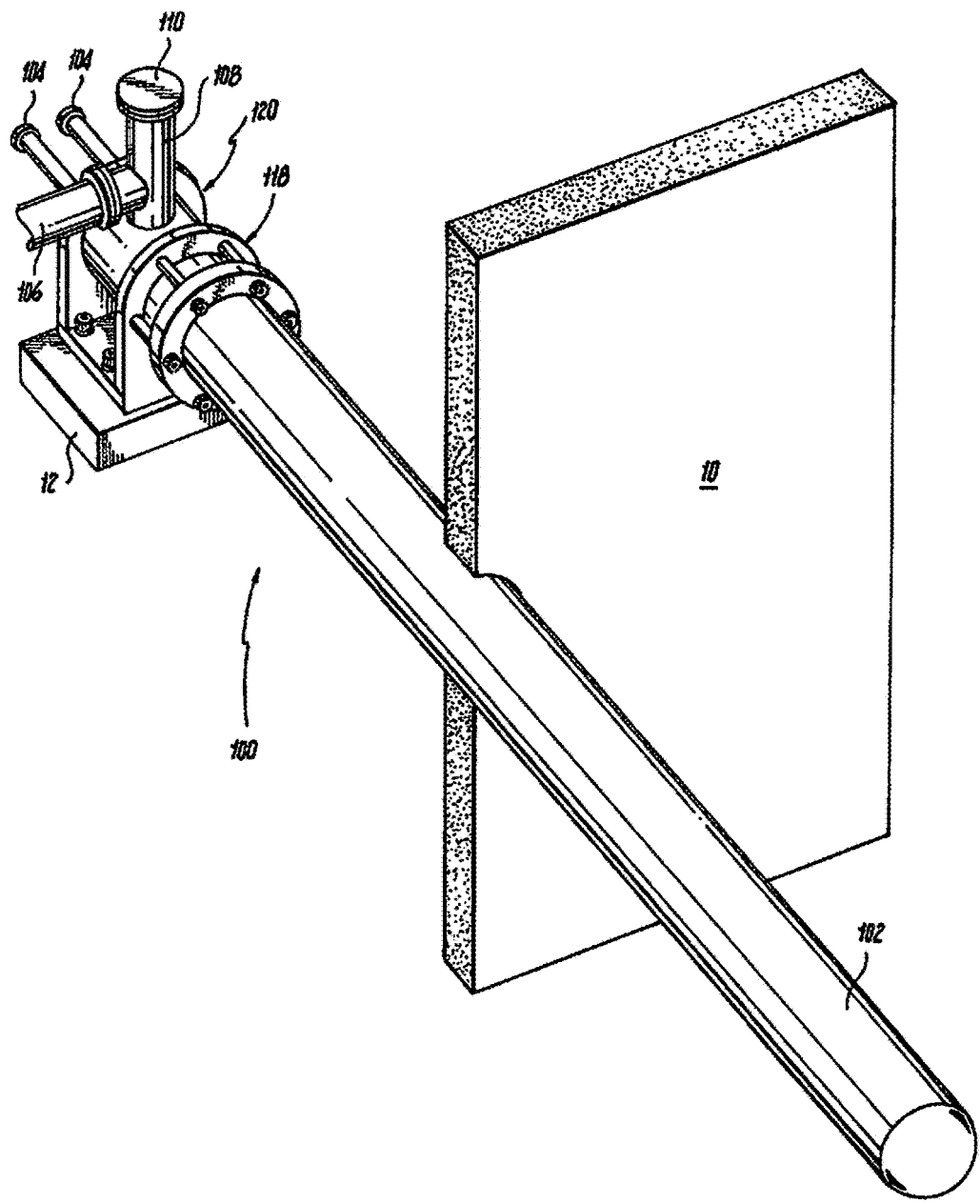
FIG. 1 is a perspective view of a micron-gap thermophotovoltaic panel assembly in accordance with the subject disclosure.

Referring now to FIG. 1, a micron-gap thermophotovoltaic panel assembly is shown and referred to generally by the reference numeral 100. The micron-gap thermophotovoltaic panel assembly 100 includes a plurality of thermophotovoltaic modules 150 (FIG. 2A, only some of which are labeled for simplicity) for converting heat energy into electric power. The micron-gap thermophotovoltaic panel assembly 100 is partially placed into a hot environment such as in the path of heat from an industrial process. The micron-gap thermophotovoltaic panel assembly 100 may simply pass through an opening formed in a wall 10 to access the heat. The micron-gap thermophotovoltaic panel assembly 100 includes an elongated housing 102 supported on a mounting bracket assembly 120. The mounting bracket assembly 120 couples to a support surface 12 so that a portion of the housing 102 passes through the wall 10 for exposure to the heat. The micron-gap thermophotovoltaic panel assembly 100 is supplied with a coolant through inlet and outlet cooling tubes 104. The cooling tubes 104 connect to a cooling system (not shown), which pumps a coolant therethrough. The cooling lines may include a pressure relief valve (not shown) to address over-pressure that may occur. Additionally, the housing 102 has a vacuum connection 106 for maintaining a vacuum within the housing 102. The vacuum connection 106 also includes a pressure relief valve 108. The pressure relief valve 108 has a restrained lid 110 held in place by the vacuum and/or an additional apparatus like a hinged plate or clip (not shown). In the event of a coolant leak or the quick creation of vapor in the housing 102, the escaping vapor displaces the lid 110 to release the vapor.

Figure 2A:
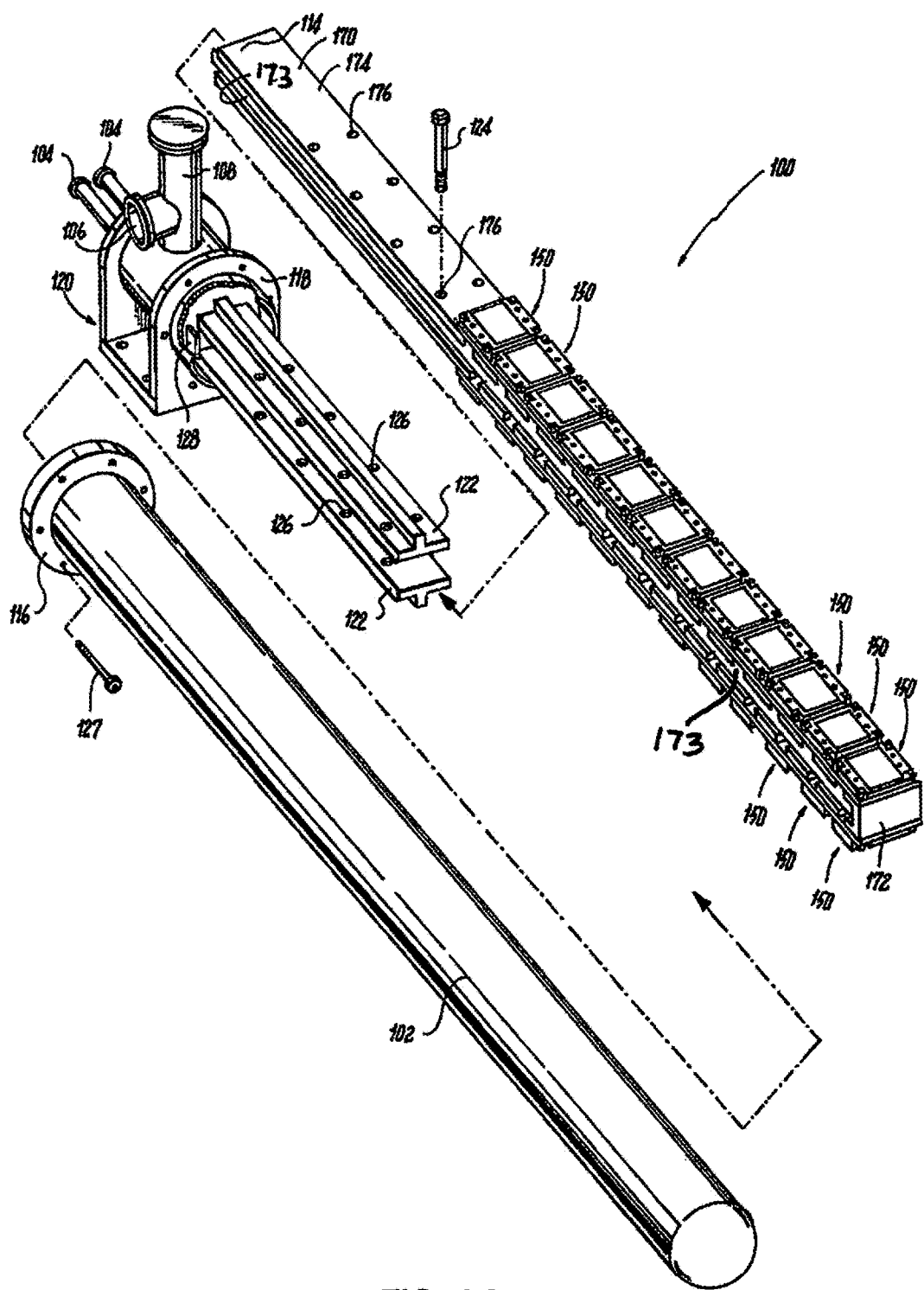
FIG. 2A is an exploded view of a micron-gap thermophotovoltaic panel assembly in accordance with the subject disclosure.

Referring additionally to FIG. 2A, an exploded view of the micron-gap thermophotovoltaic panel assembly 100 is shown. The thermophotovoltaic modules 150 attach to a heat sink 170. The thermophotovoltaic modules 150 are mounted towards a distal end 172 of the heat sink 170 on opposing top and bottom surfaces 174. A sidewall 173 extends between the top and bottom surfaces 174. The heat sink 170 may be monolithic or fabricated from a plurality of components to form a plurality of cooling passages in fluid communication with the cooling tubes 104. As the cooling system pumps coolant through the tubes 104 and passages of the heat sink 170, the thermophotovoltaic modules 150 are cooled.

Preferably the heat sink 170 is composed of material, such as a metal (e.g., aluminum, copper or steel) or thermally conductive ceramic, which is highly thermally conductive for the purposes of cooling the thermophotovoltaic modules 150. In one embodiment, the micron-gap thermophotovoltaic panel assembly 100 has twenty-four thermophotovoltaic modules 150 that are approximately 6 cm by 6 cm and almost square. The heat sink 170 is approximately 55 inches long, 4 inches wide, and 1 inch thick.

The high-temperature housing 102 encloses the heat sink 170. The housing 102 may be metallic, quartz, ceramic such as silicon carbide, or other materials. The housing 102 may be formed by extruding or isostatic pressing and then sintering of a material such as silicon carbide. The housing 102 can be opaque and fully absorbing of surrounding heat. Upon heating, the housing 102 then radiates infra-red energy to the thermophotovoltaic modules 150. The housing 102 may alternatively be translucent or semi-transparent, wherein some energy is absorbed to heat the housing and some energy is transferred therethrough. As such, the thermophotovoltaic modules 150 receive energy from housing irradiation and from the surrounding environment. The housing 102 can also be transparent, wherein surrounding energy is transferred therethrough to the thermophotovoltaic modules 150. In another embodiment, the housing 102 has one or more windows or features that vary the level of transparency, translucency or opacity in different regions of the housing 102.

The heat sink 170 is cantilevered into the housing interior 112 (FIG. 4) to minimize thermal conduction between the thermophotovoltaic modules 150 and the housing 102. The housing 102 and/or the heat sink 170 may include one or more bumpers, rings or protrusions to prevent damage from inadvertent contact with the housing such as during assembly. Alternatively, the heat sink 170 is not cantilevered and one or more elements support the heat sink 170 in the housing 102 and/or set the position of the heat sink 170 within the housing 102. Preferably, the support elements are non-conducting to minimize thermal conduction between the thermophotovoltaic modules 150 and/or heat sink 170 and the housing 102.

Figure 5:
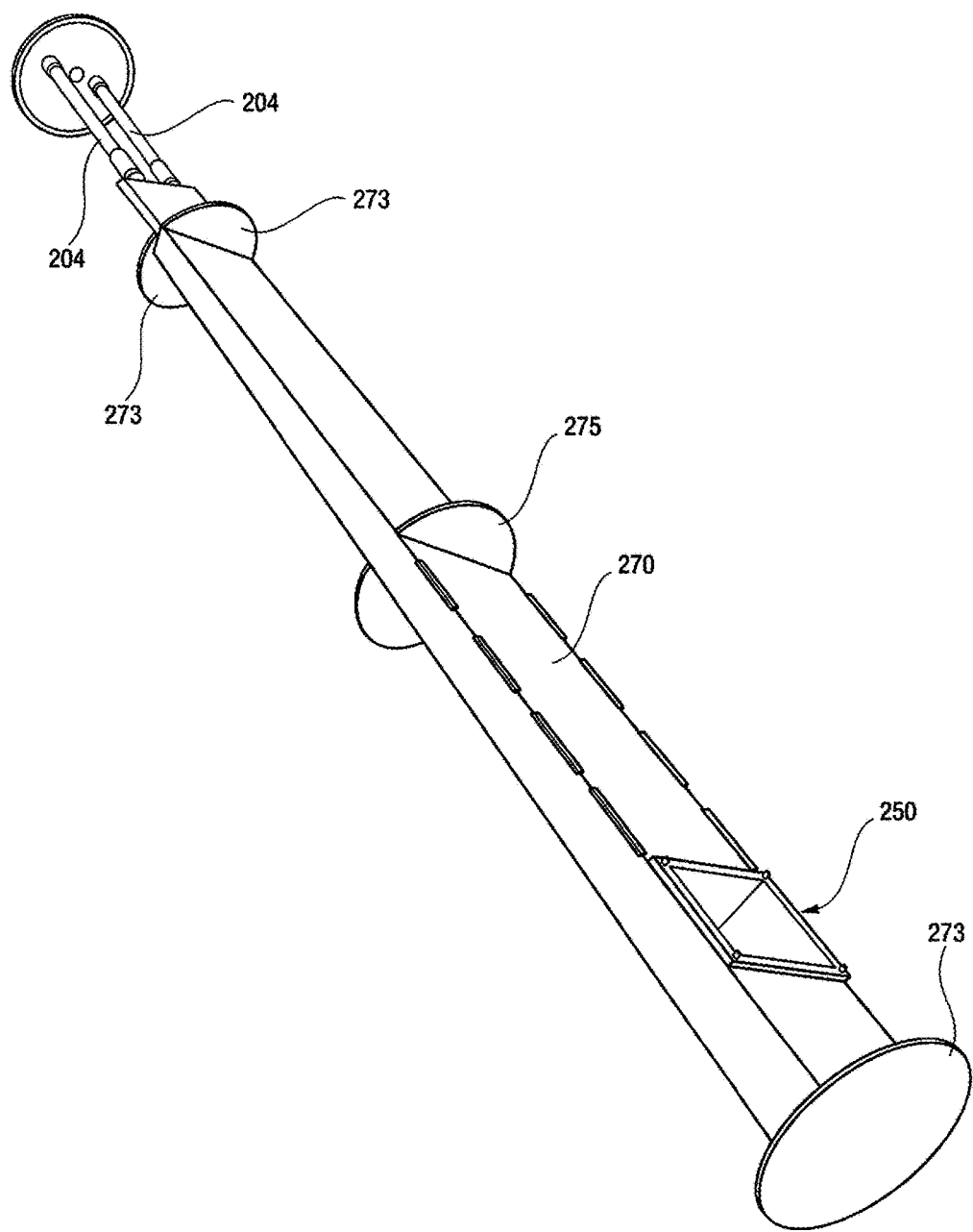
FIG. 5 is a perspective view of another thermophotovoltaic panel assembly in a partially assembled state to illustrate the components in accordance with the subject disclosure.

For example, another heat sink 270 is shown in FIG. 5 in a partially assembled state. As will be appreciated by those of ordinary skill in the pertinent art, the heat sink 270 and thermophotovoltaic modules 250 utilize similar principles to the thermophotovoltaic panel assembly 100 described above. Accordingly, like reference numerals preceded by the numeral "2" instead of the numeral "1" are used to indicate like elements. The primary difference is the non-conducting elements 273 that fit around the heat sink 270 at one or more locations. In one embodiment, the non-conducting elements 273 are quartz disks. Many alternatives such as bumpers, protrusions, feet, standoffs, rigid frames, rings and the like can be used in various combinations. The thermophotovoltaic panel assembly 100 may also include a partition 275 to confine radiant light to the area to be illuminated. The partition 275 may be reflective and/or additionally support the heat sink 270.

Still referring to FIG. 2A, the heat sink 170 has a proximal end 114 coupled to the mounting bracket assembly 120 by support bars 122. The support bars 122 extend from the mounting bracket assembly 120. The heat sink 170 slides between the support bars 122 and is held in place by bolts 124 (only one shown for simplicity) passing through holes 126 in the bars 122 into threaded bores 176 in the heat sink 170. Preferably, each support bar 122 is welded to the mounting bracket assembly 120 and together the two support bars 122 support the cantilevered weight of the heat sink 170.

The housing 102 has a proximal collar or flange 116 that couples to a bracket 118 by bolts 127 passing through clearance holes in a flange bracket 118. Preferably, high temperature seals (not shown) are used between the proximal end 114 of the housing 102 and bracket 118. The housing 102 is connected to the vacuum connection 106 so that the housing interior 112 is evacuated and, in turn, the thermophotovoltaic modules 150 are in a vacuum. The mounting bracket assembly 120 also includes an electrical conduit or connection 128. The electrical connection 128 brings electricity from the thermophotovoltaic modules 150 to electrical power conditioning mechanisms such as inverters that may be remotely located as needed.

Figure 2B:
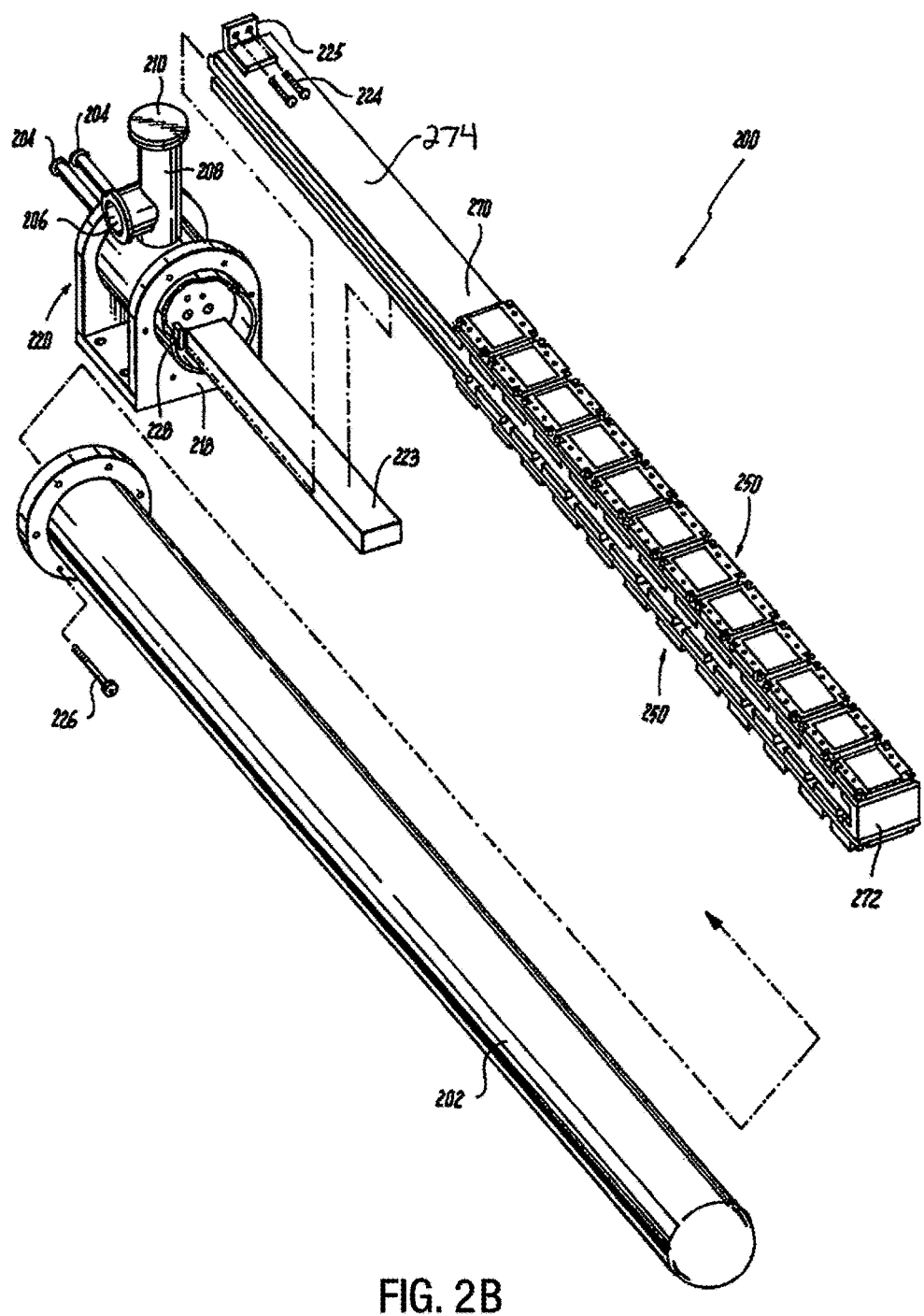
FIG. 2B is an exploded view of another micron-gap thermophotovoltaic panel assembly in accordance with the subject disclosure.

Referring now to FIG. 2B, an exploded view of another micron-gap thermophotovoltaic panel assembly 200 in accordance with the subject disclosure is shown. Similar elements to those described in connection with above-described embodiments are indicated with the like reference numbers. Many elements are essentially the same as those of the foregoing embodiments and, thus, are not further described herein. The primary difference is method for cantilevering the heat sink 270 in the housing 202.

The heat sink 270 is supported by a lower frame 223. The lower frame 223 and heat sink 270 preferably bolt together. The top surface 274 of the heat sink 270 has an upstanding L-bracket 225 that bolts to the mounting bracket assembly 220 to further stabilize and maintain proper positioning of the heat sink 270. It is envisioned that the heat sink 270 may only contact the lower frame 223 and L-bracket 225 so that a gap is formed between the proximal end of the heat sink 270 and the bracket 218 to facilitate connection of facilities.

Figure 3:
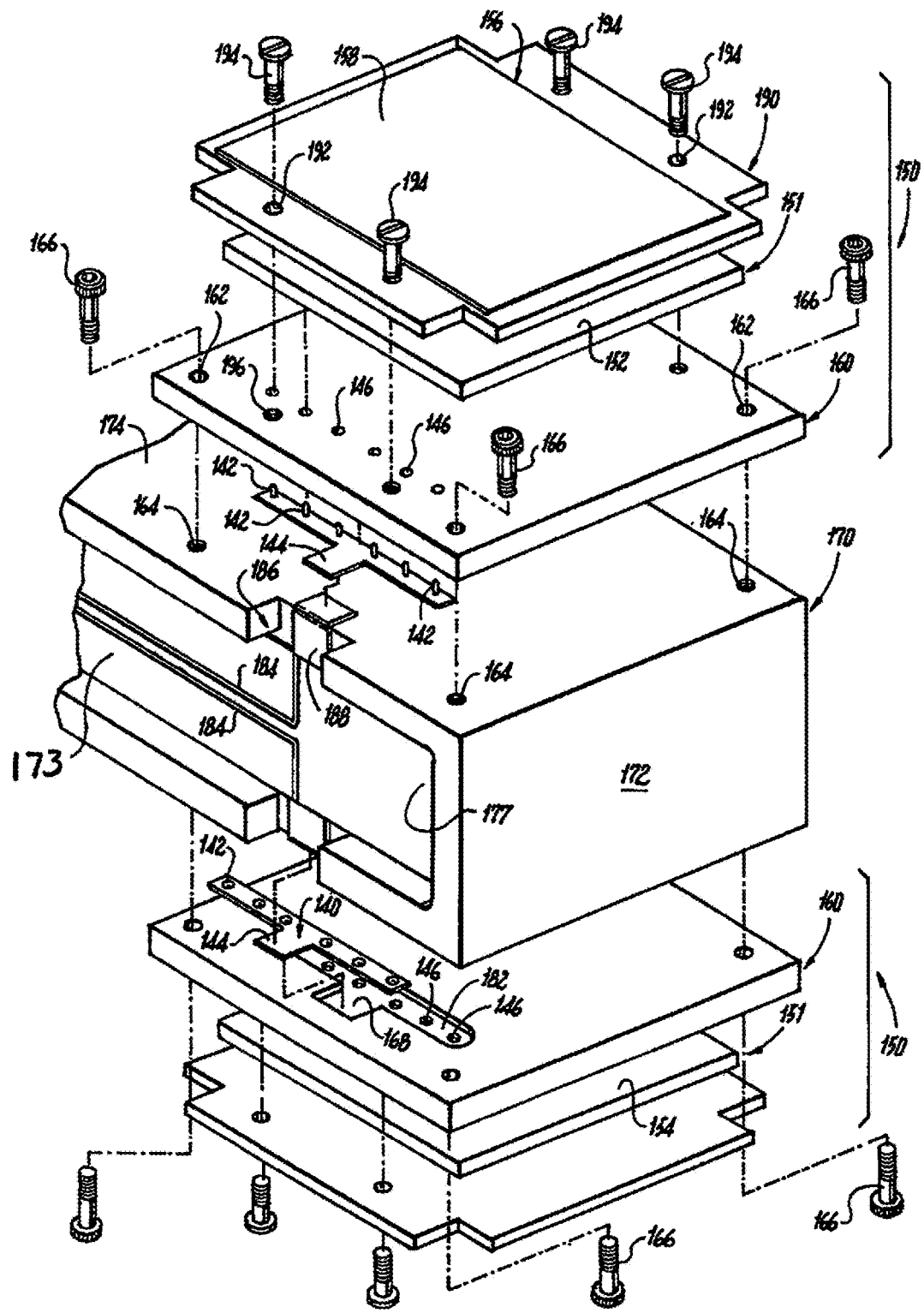
FIG. 3 is an exploded view of micron-gap thermophotovoltaic module in accordance with the subject disclosure.

Referring now to FIG. 3, an exploded view of a thermophotovoltaic module 150 is shown. Each thermophotovoltaic module 150 is preferably the same, however each may also vary depending upon the application and placement location of the thermophotovoltaic module 150 along the length of the heat sink 170. It is noted that the renderings herein are for illustrative purposes, and the scale and thickness of various components may be quite different when manufactured.

The thermophotovoltaic module 150 includes a photovoltaic element assembly 151 with a photovoltaic element 152 and an emitter assembly 156 with an emitter 158. For clarity, it is noted that the emitter assembly 156 is under the force application layer 190 and the force application layer 190 is drawn as translucent. The photovoltaic element 152 and emitter 158 are separated by a micron-gap when assembled. The micron-gap is maintained by sub-micron-sized spacers (not explicitly shown). For example, U.S. Pat. No. 8,829,335 to Grieff issued on Sep. 9, 2014 and U.S. Pat. No. 8,633,373 to Grieff et al. issued on Jan. 21, 2014 illustrate spacers for maintaining micron-gaps in photovoltaic cells. Such spacers now known and later developed may be utilized in the subject technology. As the housing 102 is maintained under vacuum, the micron-gap is evacuated.

A base substrate 160 is sandwiched between the thermophotovoltaic module 150 and the heat sink 170 to facilitate cooling of the thermophotovoltaic module 150 by the heat sink 170. The base substrate 160 defines four corner mounting holes 162 aligned with threaded bores 164 formed in the heat sink 170 so that bolts 166 can fix the base substrate 160 in place. The base substrate 160 may have layers applied thereto with thermal interface properties. Preferably, the base substrate has high through-thickness thermal conductivity and high lateral thermal conductivity for improved heat spreading, as well as facilitation (such as through surface roughening or texturing or the accommodation of a thermal interface material positioned above and below the base substrate) for reducing interface thermal resistance at surfaces.

It is recognized that bolts are one type of fastener. It is envisioned that any type of fastener may be interchanged with the fasteners noted herein. For example without limitation, a fastener may be selected from bolts, rivets, staples, clamps, bond material and the like as well as combinations thereof. The fasteners may be mechanically stiff when applied or feature mechanically compliant characteristics. Mechanically compliant properties advantageously prevent force concentrations that damage components. The base substrate 160 may also be bonded in place to the heat sink 170.

Preferably, the base substrate 160 comprises an interstitial material with high thermal conductivity and which forms interfaces with low thermal contact resistance between it and the photovoltaic element assembly 151 and between it and the heat sink 170. Alternatively, the thermophotovoltaic module 150 and even the photovoltaic element 152 may directly contact the heat sink 170 with or without bonding. The photovoltaic element assembly 151 and photovoltaic element 152 may be square, triangular, round or any desired shape. Similarly, the emitter assembly 156, emitter 158, and base substrate 160 can be various shapes.

The base substrate 160 also facilitates electrical coupling to the photovoltaic element assembly 151 by defining a recess 168 for pin board 140. The pin board 140 has a series of pins 142 that pass through a series of apertures 146 to contact the photovoltaic element assembly 151, which is formed with corresponding electrical pads (not shown). The pins 142 may be mechanically compliant such as spring-loaded. The pin board 140 also includes a conductive pad 144 in electrical communication with the pins 142. As such, the conductive pad 144 is in electrical communication with the photovoltaic element assembly 151.

The sidewall 176 of the heat sink 170 forms an elongated recess 177 through which wires 184 are run. The recess 177 is preferably enclosed by a cover (not shown). The wires 184 run down the sidewall 176 of the heat sink 170 from the electrical connector 128 (shown in FIG. 2A). A single wire 184 turns toward each thermophotovoltaic module 150. In one embodiment, twenty-four wires pass from the electrical connector 128 with the outermost wires turning up and down, respectively, at each thermophotovoltaic module 150.

So for example, at the $3^{rd}$ and $4^{th}$ thermophotovoltaic modules 150 from the distal end 172, there would be four wires 184. Two of the wires 184 pass to the $1^{st}$ and $2^{nd}$ thermophotovoltaic modules 150 on the distal end 172, one turns upward to connect to the $3^{rd}$ thermophotovoltaic module 150, and one turns downward to connect to the $4^{th}$ thermophotovoltaic module 150. The wires 184 can be discrete or fabricated as an assembly such as a flex print assembly wherein the wires 184 are lithographically defined into a flexible flat cable.

The heat sink 170 also forms a plurality of slots 186 through which electrical lands 188 pass, respectively. Each land 188 may be gold, copper, or any electrically conductive material. As the wires 184 turn towards the thermophotovoltaic modules 150, the wires 184 connect to the lands 188. In turn, the lands 188 are connected electrically to the conductive pads 144. As such, electrical continuity is established from the electrical connector 128 to the photovoltaic element 152.

The emitter assembly 156 substantially covers the photovoltaic element assembly 151. The emitter assembly 156 preferably applies a force to maintain the micron-gap between the photovoltaic element 152 and the emitter 158. The emitter assembly 156 includes a force application layer 190 on top of the emitter 158 for applying the force. The force application layer 190 defines four holes 192 for screws 194 that couple to threaded holes 196 in the base substrate 160. As such, a relatively light torque may be applied to the screws 194 in comparison to the bolts 166.

In an alternative embodiment, there are no threaded holes 196 in the base substrate 160. Instead, the base substrate 160 forms clearance holes and the screws 194 couple to nuts. The nuts are backed by springs so that the springs press into the bottom of the base substrate 160. The springs provide compliance so that the force within the screws does not create overly large forces that would break one or more layers of the thermophotovoltaic module 150. The force application layer 190 is selected from a material so as to not interfere with the operation of the emitter 158. Typically, the force application layer 190 would cover the emitter 158.

Alternatively, there is no force application layer. Instead, the emitter 158 is robust enough to form screw holes so that screws passing through the screw holes maintain the components in proper position. In another embodiment, the thermophotovoltaic module is hermetically sealed so that only the interior of the thermophotovoltaic module is under vacuum. For example, the thermophotovoltaic module may be hermetically sealed, wherein the walls of the hermetic seal sustain the force to maintain the micron-gap. The hermetic sealing apparatus can also alleviate the need for separate fasteners by applying a force to maintain the thermophotovoltaic modules 150. For example, the walls of the hermetic sealing apparatus can apply a retentive force to maintain the micron-gap.

Figure 4:
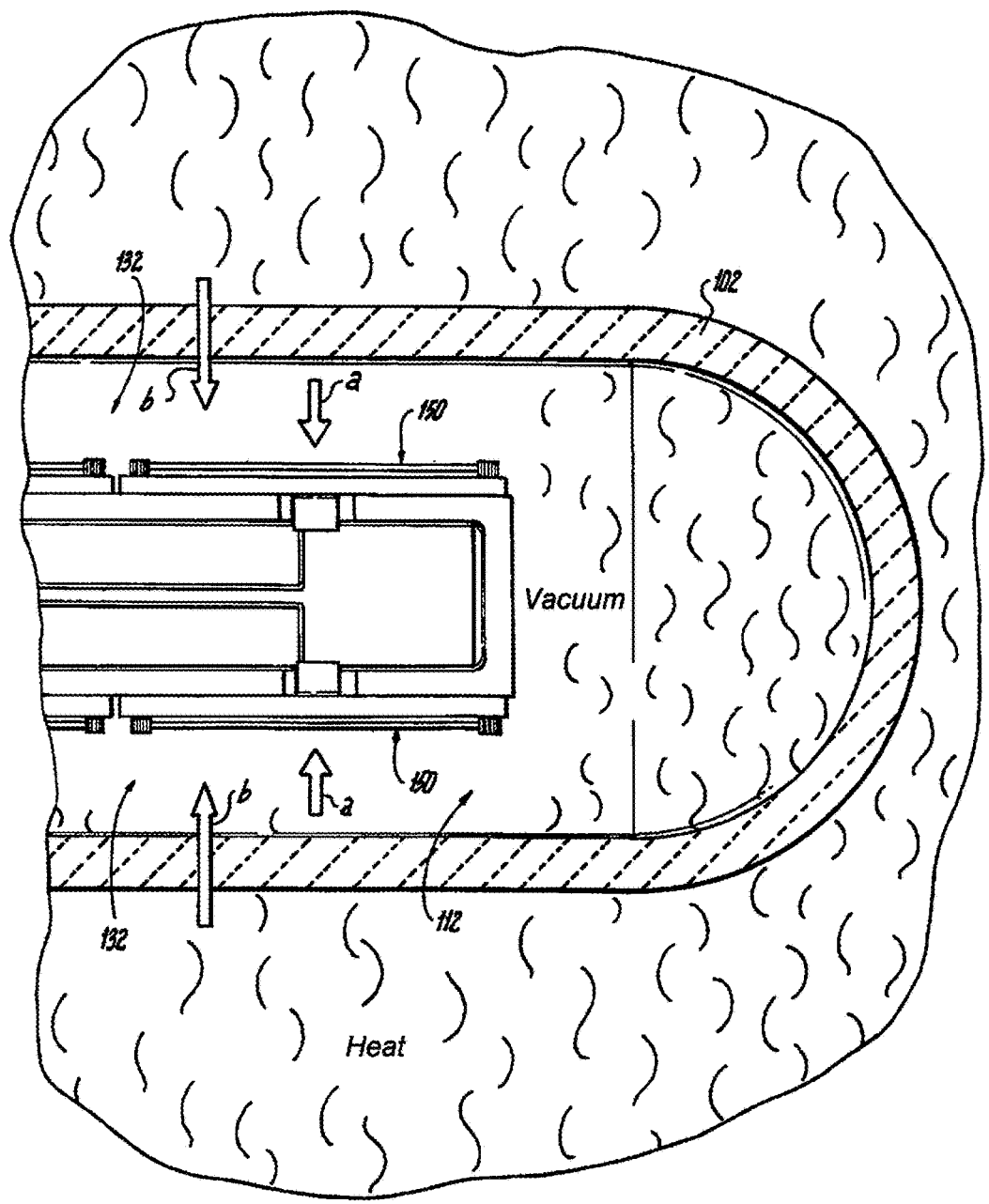
FIG. 4 is a partial cut away to illustrate operation of a micron-gap thermophotovoltaic panel assembly in accordance with the subject disclosure.

Referring now to FIG. 4, in operation, the micron-gap thermophotovoltaic panel assembly 100 is secured to or inserted into a hot and/or highly radiative environment which contains energy for desirable conversion into electrical energy. The housing 102 can be fabricated to absorb and/or transfer energy from the environment and is thereby heated and/or irradiated so that energy radiates onto the thermophotovoltaic modules 150 from the housing 102 (represented by arrows "a") and/or the environment (represented by arrows "b"). As the housing 102 is under vacuum and not touching the thermophotovoltaic modules 150, minimal, if any, energy passes from the environment to the thermophotovoltaic modules 150 by conduction or by convection.

By having the space 132 between the housing 102 and the thermophotovoltaic modules 150, neither the presence of a precision flat inner housing surface nor the physical robustness needed for maintaining uniform and high force on a chip stack being held against the inner housing surface is required. The space 132 between the housing 102 and the force application layer 190 or the emitter 158, as the case may be, also relieves a need for thermal interface materials therebetween. The space 132 alleviates stresses from contact between the housing 102 and thermophotovoltaic modules 150.

The force application layer 190 is a reliable force application mechanism to maintain the micron-gap so that the photovoltaic element 152 can function properly when the emitter 158 is irradiated with incoming energy from the housing 102 and/or environment. When exposed to incoming energy, the emitter 158 absorbs the incoming energy, and thereby heats up (i.e., the emitter assembly 156 is the hot side). The heated emitter 158 re-emits the energy across the micron-gap to the photovoltaic element 152.

The evacuated micron-gap minimizes convective and molecular heat transfer from the emitter 158 to the photovoltaic element 152, while evanescent coupling of energy occurs for highly effective energy transfer between the emitter 158 and the photovoltaic element 152. Each thermophotovoltaic module 150 is cooled by the liquid cooled heat sink 170 (i.e., the photovoltaic element assembly 151 is the cold side). The photovoltaic element 152 converts the transferred energy into electrical energy.

The power generated by the thermophotovoltaic modules 150 is carried by the electrical pins 142, pads 144, lands 188, wires 184, electrical connector 128 and various connections, as necessary, to electrical power conditioning mechanisms. A computer controller (not shown) can monitor, vary operation, and modify the energy conversion system. The computer controller also includes capability for providing warnings to operators and/or providing automatic resolution to conditions that would cause damage to the micron-gap thermophotovoltaic panel assembly 100, operators, and/or the environment. For example, the computer controller may vary the insertion depth or completely remove the housing from the hot environment.

In one embodiment, the micron-gap thermophotovoltaic panel assembly 100 has the housing positioned on a linear actuator (not shown) for precise control of depth of insertion into the hot and/or highly radiative environment. For example, the support surface 12 may simply be part of a cart with wheels. Alternatively, the support surface may be mounted to a fixture (not shown) that is guided by rails and/or a rack-and-pinion mechanism for positioning the fixture and, thereby, the micron-gap thermophotovoltaic panel assembly 100. The movement may be motorized or even manual.

In an alternative embodiment, the housing is fixed in place in a hot environment. The heat sink 170, and thereby the thermophotovoltaic modules 150, may be on a similar or different linear actuator for precise control of depth of insertion into the housing 102. Still further, an outer housing (not shown) could be mounted in the hot environment or to the mounting bracket 120 for movement therewith. The outer housing would be very similar in shape to the housing 102 except slightly larger to surround and, thereby, protect the housing 102 in the hot environment.

In another embodiment, the heat sink 170 may be differently shaped so that the heat sink 170 has more than two sides, each side having thermophotovoltaic modules 150 thereon. For example, the heat sink may be triangular, square, pentagonal, hexagonal, octagonal etc. As an example, see FIGS. 16A-D described below.

Figure 6:
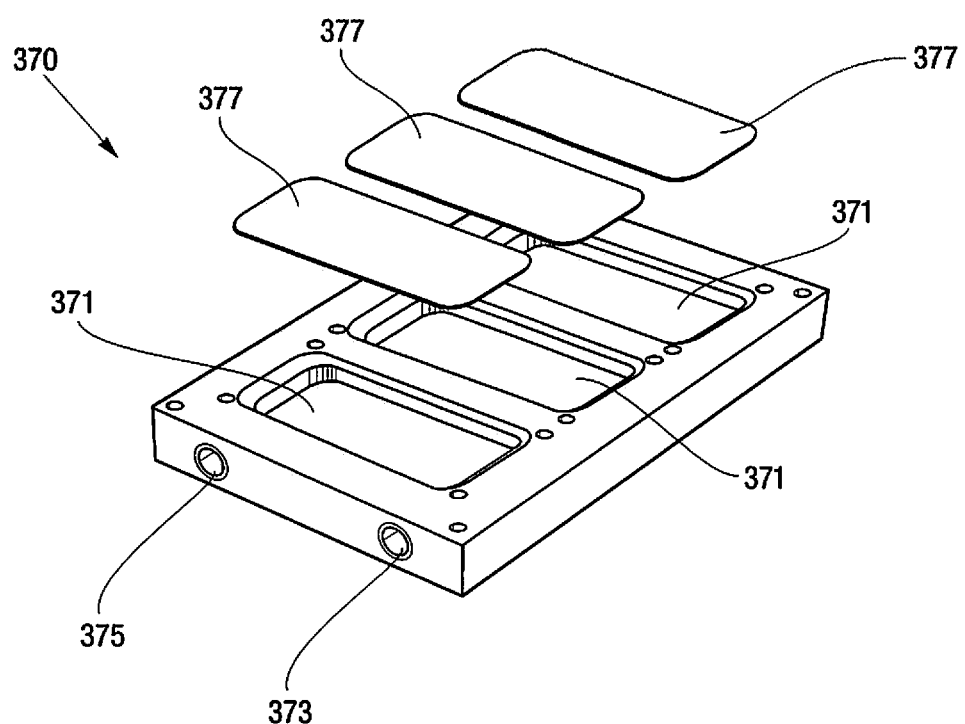
FIG. 6 is an exploded view of a prior art heat sink.

Referring now to FIG. 6, an exploded view of a prior art heat sink 370 is shown. The heat sink 370 includes a plurality of cooling bays 371 as part of a fluidic circuit with an inlet 373 and an outlet 375. Each cooling bay 371 includes pin plates 377 that facilitate heat exchange with the cooling fluid. For example, the pin plates 377 may have fins and/or pins that form flow channels to increase surface area contact.

Figure 7:
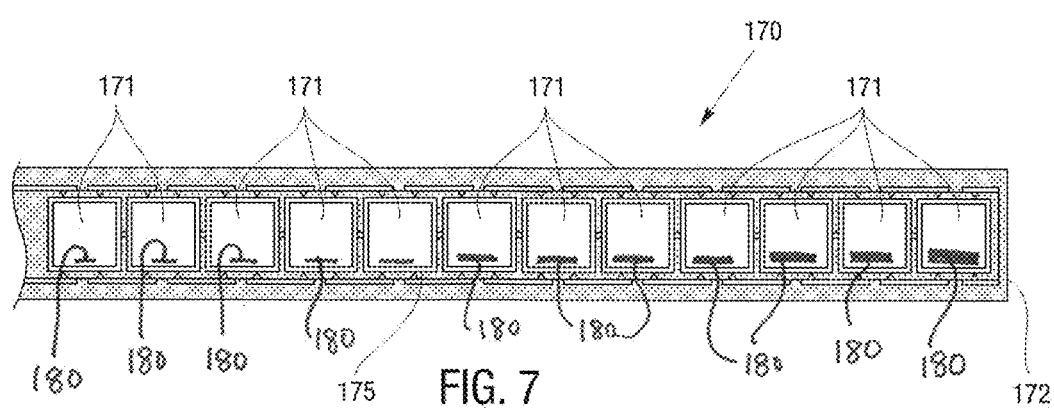
FIG. 7 is a lengthwise sectional view illustrating the cooling bays of a heat sink in accordance with the subject disclosure.
Figure 9:
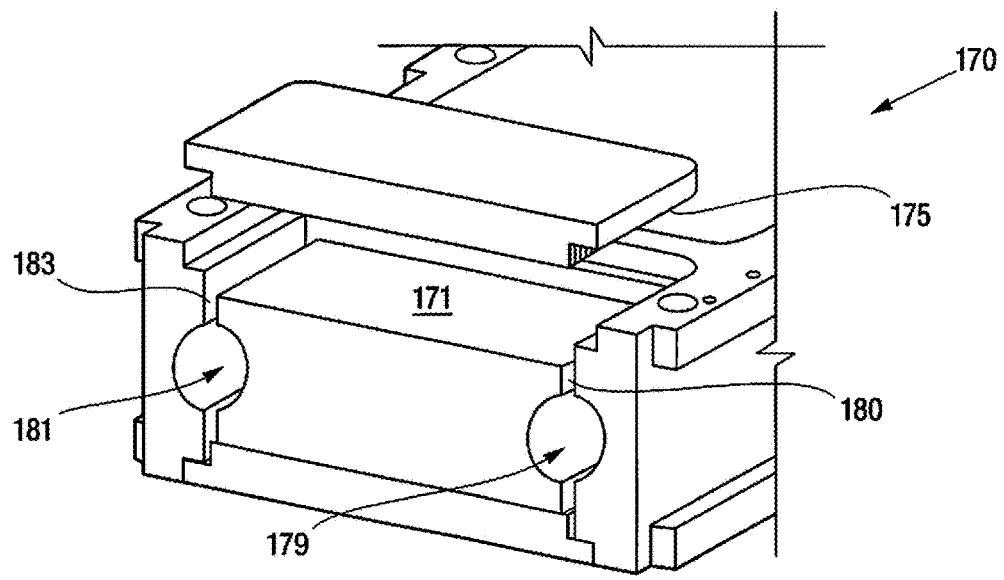
FIG. 9 is a cross-sectional view illustrating the cooling bays of a heat sink in accordance with the subject disclosure.

Referring now to FIGS. 7 and 9, various sectional views of a heat sink 170 are shown. The heat sink 170 includes a plurality of cooling bays 171 having cooling fins or pins 175 therein. The cooling bays 171 are located under each module 150. The inlet and outlet cooling tubes 104 provide cooling fluid to the cooling bays 171.

Figure 8:
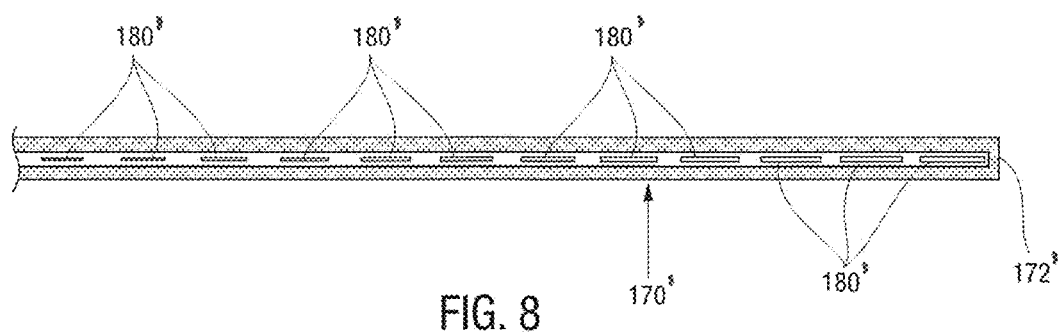
FIG. 8 is an alternative lengthwise sectional view illustrating an inlet manifold of a heat sink in accordance with the subject disclosure.

The cooling fluid enters the cooling bays 171 from an inlet manifold 179 via an inlet slot 180. The cooling fluid passes from the cooling bays 171 into an outlet manifold 181 through outlet slots 183. As best seen in FIG. 7, the area of the inlet slots 180 increases from bay 171 to bay 171 along the distal direction towards the distal end 172. The slots 180 may increase in length and/or height to provide the increased area/flow. This increased cross-sectional area of the inlet slots 180 as the cooling bays 171 progress from a proximal to a distal location optimally balances the cooling being provided to all cooling bays 171, and therefore to all modules 150. As a result, the modules 150 are efficiently cooled to optimize efficient production of electricity. Alternatively, the length of the inlet slots 180 may vary instead of or in addition to the width to accomplish tuning the cooling along a length of the heat sink 170. The shape and size of the inlet slots 180 can also be tuned to address local variation in cooling requirements as heat and/or radiation may be unevenly applied to the thermophotovoltaic panel assembly 100. FIG. 8 shows an alternatively varied slot 180' configuration.

Figure 10:
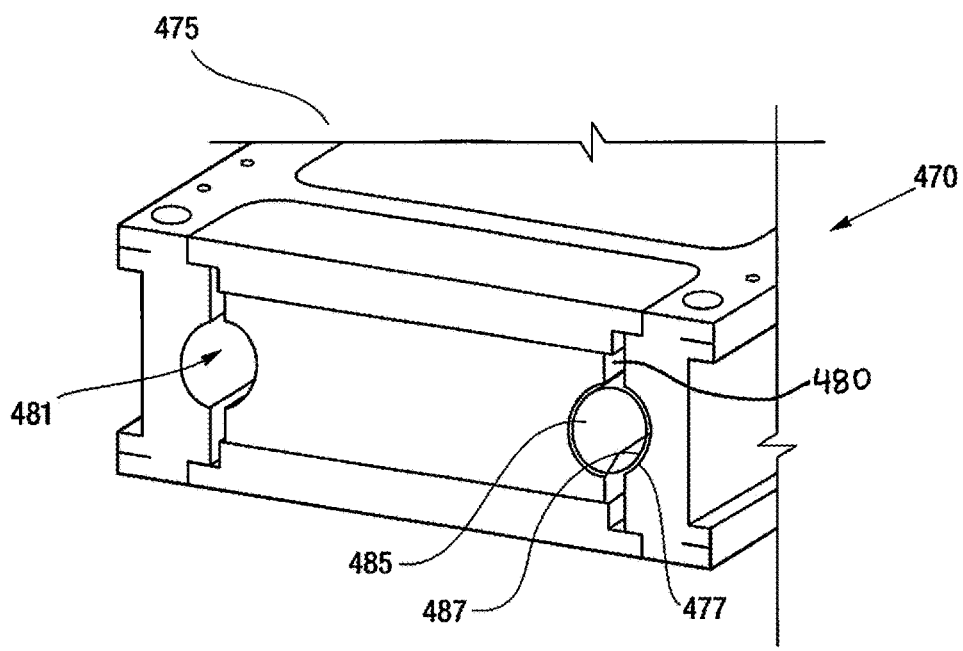
FIG. 10 is a cross-sectional view illustrating another heat sink in accordance with the subject disclosure.

Referring now to FIG. 10, a cross-sectional view illustrating another heat sink 470 in accordance with the subject disclosure is shown. The heat sink 470 includes a tube or sleeve 485 inserted in the inlet manifold 477. The sleeve 485 forms slots 487 that vary in size in order to vary the size of the inlet slots 480 from bay 471 to bay 471 along the distal direction. The larger inlet slots 487 nearer the distal end of the sleeve 485 create increased flow in the more distally positioned cooling bays 471. Again, the shape and size of the inlet slots 487 can be tuned as desired such as to address local variation in cooling requirements as heat may be unevenly applied to the thermophotovoltaic panel assembly 100.

Figure 11:
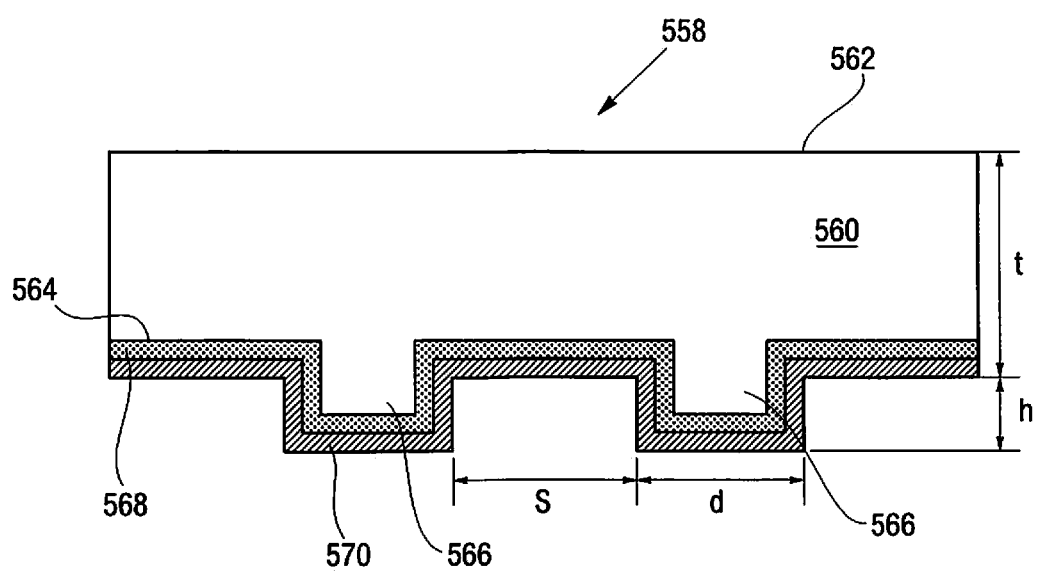
FIG. 11 is a cross-sectional view of an emitter in accordance with the subject disclosure.

Referring to FIG. 11, a cross-sectional view of an emitter 558 in accordance with the subject disclosure is shown. The emitter 558 is an exemplary thin film emitter for incorporation in micron-gap thermophotovoltaic panel assemblies as described herein and in other applications. The emitter 558 has a substrate 560 fabricated from an optically transparent media such as fused silica, quartz or sapphire. In lower temperature embodiments, additional media such as glass can be used.

The substrate 560 has a first surface 562 and a second surface 564 opposite the first surface 562. The second surface 564 faces the photovoltaic assembly (not shown). To maintain the gap to the photovoltaic assembly, the second surface 564 can form a plurality of spacers 566. As can be seen, the substrate 560 can be made relatively thickly, which provides greater structural strength, improved flatness, and force uniformity on the gap. In one embodiment, the substrate 560 is approximately 4 mm in thickness "t" with about 1 mm in spacing "s" between spacers 566, which are about 100 um in diameter "d" and 0.15 um in height "h".

In one embodiment, the second surface 564 has a thin layer 568 of optically opaque material deposited thereon. In one embodiment, the thin layer 568 is carbon. In another embodiment, the thin layer 568 is a high index material such as silicon. The thin layer 568 is designed to absorb infrared light emitted from a hot radiative heat source to radiate energy to the photovoltaic element for absorption thereby. In short, the optically transparent substrate 560 with the thin layer 568 is positioned between a heat source (not shown) and the photovoltaic assembly, which can convert infrared light into electric current. Preferably, at least one dimension of the gap is smaller than the wavelengths of the infrared light.

The thickness of the thin layer 568 should be chosen to be thick enough to absorb most or all of the infrared light emitted from the heat source, yet the thickness of the thin layer 568 should be thin enough to limit the lateral conduction of heat to and through the gap forming means 566. The thinness of the thin layer 568 acts like a thermal resistor, thereby limiting the lateral flow of heat laterally through the thin layer 568. In a preferred embodiment, the optically transparent substrate 560 is generally transparent to infrared light and has high thermal resistance, as well as being composed of materials suitable for high-temperature operation, such as quartz, silica, and sapphire. The high through-thickness thermal resistance of the optically transparent media substrate 560 in combination with the geometrically-constrained high lateral thermal resistance of the thin layer 568 act together to limit the transport of thermally conducted energy through the gap forming means 566. In one embodiment, the thin layer 568 is at least 100 nanometers in thickness, and preferably several microns in thickness, to allow for sufficient absorption of the infrared light.

In another embodiment, for micron-gap thermophotovoltaic applications, the thin layer 568 includes a second layer 570. The second layer 570 should be composed of materials with high infrared absorption and high index of refraction, such as amorphous silicon and polycrystalline silicon. In yet another embodiment, the thin layer 568 can be omitted and only second layer 570 is used because the second layer 570 has sufficiently high absorption. As would be appreciated by review of the subject technology, various coatings may be applied to the first surface 562. For example, anti-reflective coatings, filter layers, alternative absorbing or reflecting layers and the like may be utilized to increase performance. Additionally, secondary and tertiary layers or emitters may additionally be applied to any of the surfaces 562, 564, 568, 570. The substrate 560 itself may be a multi-layer structure. In effect, two or more fused silica layers can be coated as desired, matched with additional layers as desired, formed with nanostructures like, without limitation, spacers, and sandwiched together in any combination.

The spacers or gap forming means 566 may be physical spacers of small lateral dimension. Each spacer 566 is separated from the nearest spacer by a distance sufficiently large to minimize thermal conduction from the thin layer 568 to the photovoltaic element. However, the distance between the spacers 566 should still be sufficiently small in order to minimize the likelihood of the thin layer 568 making direct physical contact with the photovoltaic element in the regions between the spacers 566.

The gap forming means 566 may be micrometer-sized disks, pillars, columns, tubes, pyramids and the like. The spacers 566 would preferably be composed from mechanically robust, thermally resistive material, such as silicon oxide. The spacer 566 may be disposed upon or embedded into, and in some cases intentionally patterned upon, the second surface 564 of the transparent substrate 560 prior to application of the thin layer 568. When the thin layer is flat and not patterned, the spacers 566 may also be applied to the outer surface of the thin layer 568, and/or the surface of the photovoltaic element. The spacers 566 can be formed integral with the thin layer 568 as well. The spacers 566 may also be formed by depositing a thermally insulating material in wells formed in the substrate so that the spacers extend above the substrate surface 564.

Figure 12A:
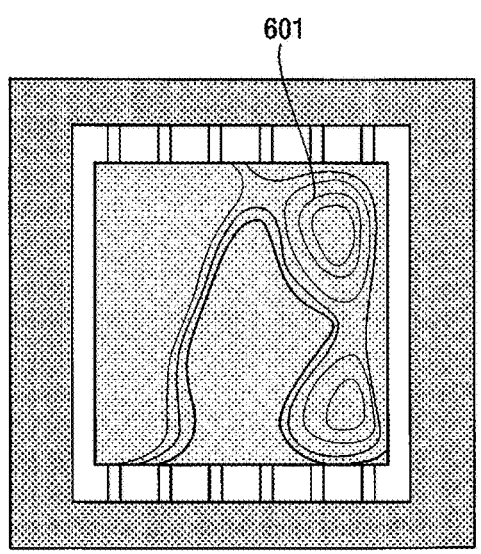
FIG. 12A is an image exemplifying a visual of an uneven gap in accordance with the subject technology.
Figure 12B:
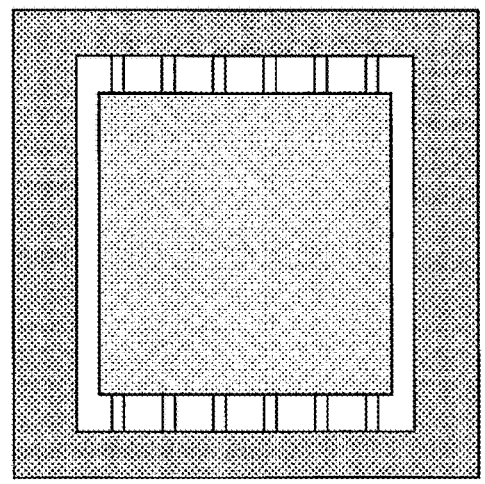
FIG. 12B is an image exemplifying a visual of an even gap in accordance with the subject technology.

Referring now to FIGS. 12A and 12B, two images of visual inspection of the gap are shown. FIG. 12A is an image 600 exemplifying a visual of an uneven gap and FIG. 12B is an image 602 exemplifying a visual of an even gap. By having a transparent emitter, a method for visual inspection of the gap is effective. Once assembled so that the emitter is positioned proximal to a second surface such as the surface of the photovoltaic element, a fringe pattern 601 is visible to the naked eye. A plurality of fringes indicates a relatively large and/or uneven gap (e.g., image 600) as compared to an assembly that has minimal or no non-uniformity of the gap (e.g., image 602).

Advantageously, the fringes allow not only quick and easy inspection of a high-quality near-field gap but real-time adjustment. A technician can adjust fastener tension and other means while using the fringe pattern as feedback for the adjustments. The size and uniformity of the gap can also be measured by an optical tool such as a UV thin film thickness measurement tool. In either case, while viewing the fringes, adjustments can be performed to improve the gap dimension and uniformity.

Figure 13A:
FIGS. 13A-E are a series of somewhat schematic cross-sectional views of various possible manufacturing steps to fabricate a thin film emitter in accordance with the subject technology.

FIGS. 13A-E are a series of cross-sectional views of various possible manufacturing steps to fabricate a thin film emitter in accordance with the subject technology. In FIG. 13A, the method starts with a relatively thick substrate 700 made from a thermally insulating material such as quartz or fused silica. Preferably, one or both sides are polished. The substrate 700 may be transparent to radiation above the band gap (e.g., 1 to 2.2 microns) for a particular photovoltaic element (e.g., InGaAs) and absorbent to radiation below the band gap (e.g., 2.2 to 10 microns). As such, significant below band gap radiation exposure will result in significant heating of the emitter.

Figure 13B:
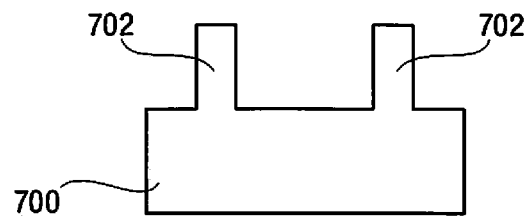
Figure 13C:
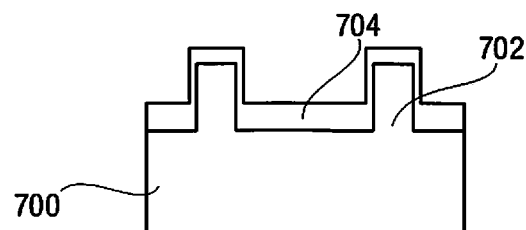

In FIG. 13B, a plurality of spacers 702 are formed by photolithography and etching. A typical spacer geometry is 10 to 100 microns in diameter with a height of 0.10 to 0.20 microns. In FIG. 13C, a layer 704 of carbon has been deposited on the substrate 700. In operation, the carbon layer 704 absorbs the incident radiation not absorbed by the substrate 700. As a result, a temperature of 1000 degrees C. may be reached. In one embodiment, the carbon layer 704 may be 0.1 to 5 microns thick.

Figure 13D:
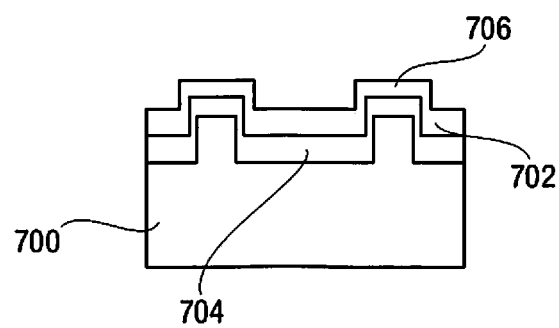

Referring now to FIG. 13D, a layer 706 of silicon is deposited on the carbon layer. The silicon layer 706 is optional but can provide the ability to index match to the photovoltaic element (e.g., InGaAs) to enhance the near-field performance. Index matching is when the index of refraction of one material closely approximates that of another so that when the two items (e.g., the layer 706 and photovoltaic element) with the same index of refraction are next to each other, radiant energy passes from one to the other with minimal reflection or refraction. The thickness of the silicon layer 706 may be similar to the thickness of the carbon layer 704.

Figure 13E:
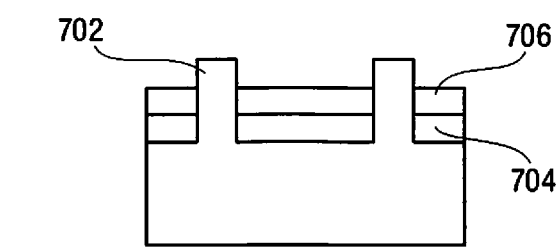
Figure 13F:
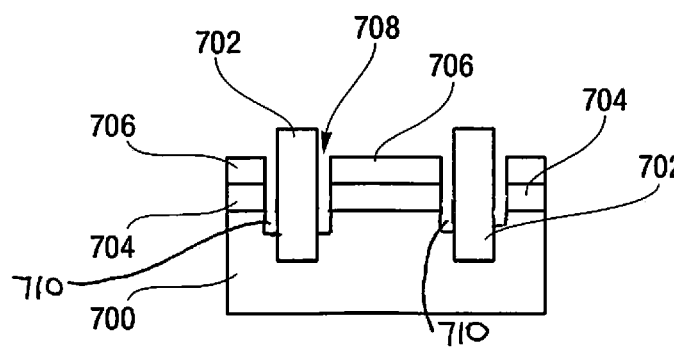
FIG. 13F is a somewhat schematic cross-sectional view of another embodiment of a thin film emitter in accordance with the subject technology.

Optionally, the carbon layer 704 and/or the silicon layer 706 may be absent just in the area of the spacers 702 as shown in FIG. 13E. As a result, the spacers 702 effectively extend through one or more of the upper layers 704, 706. In another embodiment, an additional area 708 around the spacers 702 does not have the silicon layer 706 and/or the carbon layer 704 such as shown in the embodiment of FIG. 13F. The spacers 702 may also be a different structure and/or material from the substrate such as an oxide or different doped area as desired. In another variation, the spacers 702 are simply taller than the thickness of the additional layer(s) and not covered with the layer(s) during the manufacturing process. In another embodiment, the substrate 700 is initially deposited with an opaque layer for facilitating handling by standard semiconductor manufacturing equipment that uses interrupt technology. In another method, a backside opaque layer is applied then later removed when no longer needed. It is envisioned that each of the structures of FIGS. 13B-E could represent finished assemblies as well as that of FIG. 13F.

In another method of manufacturing a substrate 700 as shown in FIG. 13F, the substrate 700 has a resist (not shown) that is applied to one surface. The resist is developed through a photolithography process so that a pattern of holes is formed. The holes have dimensions that approximately match the desired lateral dimensions of the spacers 702. By forming the holes in the resist layer, a portion of the substrate 700 at the bottoms of the holes is exposed.

A spacer material, such as silicon oxide, is deposited across the entire surface of the resist coated substrate, and the spacer material partially or entirely fills the holes in the resist layer to come into physical contact with the substrate 700 which is exposed at the bottoms of the holes in the resist layer. In cross-section, the holes in the resist layer may be circular or any other two-dimensional shape such as oval, triangular, square etc. even though the spacers may taper to a narrow flat top, a point or otherwise vary in shape. A thermal process may be used to ensure good mechanical bonding between the spacer material and the substrate 700 at the bottoms of the holes. Through a lift-off process, the resist layer and most of the spacer material layer are removed, leaving behind spacers 702 adhered to the substrate 700. One or more of the additional layers 704, 706 can then be applied as preferred.

In one embodiment, the substrate 700 is coated with a deposited spacer material that is known to have an increased volume when oxidized or subsequently subjected to a further processing step which increases material volume. Such a material with this property of volumetric increase as a result of thermal oxidation may be silicon, which oxides to become silicon oxide. Alternatively the substrate 700 may have a thin layer of oxidizeable material, such as silicon, bonded thereto or grown thereon. In the next step, a masking layer, such as silicon nitride, is deposited upon the unoxidized spacer material. Through photolithography processing steps, a pattern of holes are formed in the masking layer with dimensions that approximately match the desired lateral dimensions of the spacers 702. As a result, a portion of the unoxidized spacer material at the bottoms of the holes is exposed.

Then, the substrate is subjected to a thermal oxidation step, which causes the unoxidized spacer material at the bottom of the holes to oxidize, thereby increasing the volume of the spacer material in the oxidized state. With the increased volume, the oxidized spacer material in the vicinity of the holes pushes up the masking material at the edges of the holes. The masking material and spacer material, if sufficiently thin and/or transparent to in-band IR radiation, can be left in place, and the pushed-up masking material becomes the bearing surface of the spacer. In another embodiment, the masking material can be stripped away so that the oxidized spacer material becomes the bearing surface of the spacers. And in yet another alternative configuration, both the masking material and unoxidized spacer material are stripped away, leaving only the oxidized spacer material as the bearing surface of the spacers.

Still referring to FIG. 13F, any of the aforementioned embodiments wherein a spacer is formed onto the substrate can be enhanced by process steps which form an isolation trench 708 around the spacer. In one embodiment, the isolation trench 708 is annular in shape with a depth of 10 to 40 microns and annular width of 5 to 100 microns. The trench 708 is formed around the spacer 702 to improve the thermal isolation of the spacer 702, so that relatively less thermal energy is transferred by conduction through the height of the spacer 702 from the emitter to the photovoltaic assembly. As noted above, the shape of the spacer 702 may also vary from the proximal to the distal end to further reduce thermal energy transfer such as a pyramid shape. The trench 708 may also have a lower end 710 that plunges down into the substrate 700.

Figure 14:
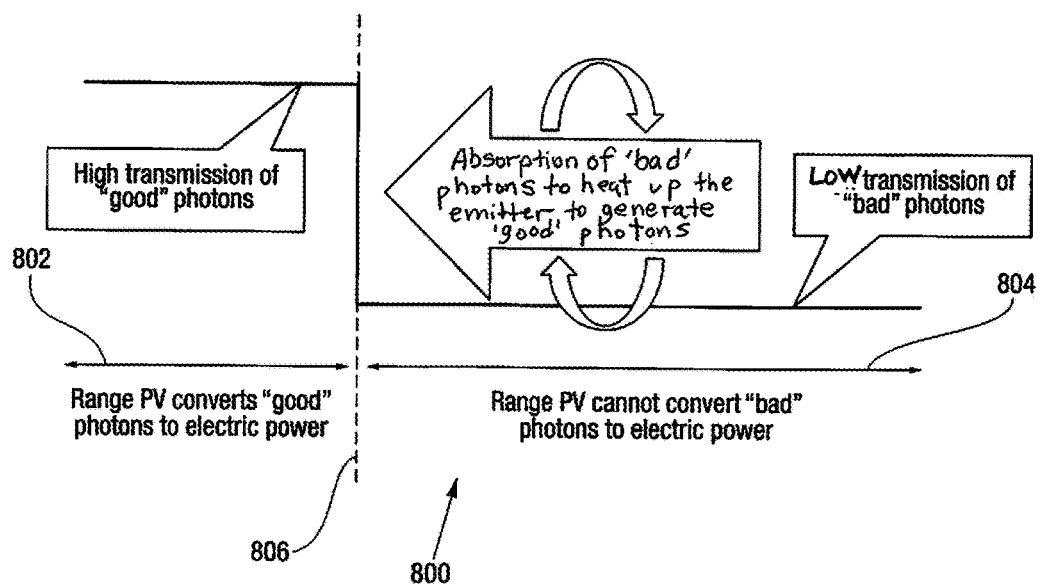
FIG. 14 is a graphical depiction of an optimized emitter with a transition between high transmission and high absorption being positioned at the band gap of the photovoltaic element in accordance with the subject technology.

Referring now to FIG. 14, a graphical depiction 800 of an optimized emitter with a transition point 806 between high transmission and high absorption being positioned at the band gap of the photovoltaic element is shown. Such an emitter can be used to fabricate an emitter tuned to maximize the efficiency of the photovoltaic element. The emitter is fabricated to largely pass photons with energies above the band gap ("AB") of the photovoltaic element where absorption and conversion into electricity is highly efficient (e.g., range 802). It is undesirable to have light/energies below the band gap ("BB") incident upon the PV element. Hence, an emitter with the filter absorbs the BB photons and becomes heated (e.g., range 804). As the emitter is not fully transmissive of AB photons, the AB photons that are absorbed also contribute to heating the emitter. Once hot enough, the emitter then radiates AB photons that are efficiently converted into electricity by a photovoltaic element or chip (PV). In short, the AB photons with energies above the band gap largely pass through the emitter for conversion by the photovoltaic element with high efficiency while the BB photons with energies below the band gap are absorbed by the emitter, which heats up and radiates additional AB photons with energies above the band gap.

A PV absorbing all wavelengths emitted from a black body or other emission source is less than optimal in operation. Typically, only above band gap (AB) wavelengths are readily converted to electrical power, whereas below band gap (BB) wavelengths are absorbed into the PV as heat and are not converted to electrical power. In another embodiment, a selective layer is inserted between the emission source and the PV to improve conversion. The selective layer may be an emitter or a separate structure.

In one embodiment, fused silica is used to provide an approximation of the desired properties of the emitter. The absorbed BB energy heats up the emitter, and near-black body re-emission from the emitter occurs. Preferably, the filter and PV are separated by a near-field (i.e., sub-wavelength) gap, so that the re-emitted energy from the emitter passes with reduced resistance to the PV. As a result, BB energy reflected back from a PV's back-side reflector (e.g., a gold layer) is also passed with low resistance across the near-field gap to the emitter, which also adds heating energy to the emitter for improved re-emission.

In a further optimization, the ideal emitter incorporates films and/or structures that facilitate an additional second transition between perfectly transmitting and perfectly absorbing or perfectly reflecting for photons with energies higher than can be converted by the photovoltaic element. The optimal placement of this second above band gap transition in the energy spectrum depends on several factors including, without limitation: the reflectivity of the photovoltaic element; the spectral response of the photovoltaic element; the energy balance between the emitter and the photovoltaic element; and the optical absorption within the body of the PV.

The presence of this second above band gap transition helps to convert the excess energy beyond the energy of the band gap possessed by very high energy photons into thermal energy which heats up the emitter. Heating of the emitter results in the thermal energy being emitted as AB photons for energy conversion by the PV.

The subject technology is not limited to any particular field or technology area. For example, the teachings herein are equally applicable to thermionics, quantum dot energy harvesting systems, solar cells, far field technology and the like now know and later developed. It is envisioned that the subject technology would be equally applicable to waste heat conversion, primary energy generation, solar power, and portable power along with other fields and applications such as photovoltaic applications as well. The subject technology can also be combined or integrated with known energy conversion mechanisms to provide a topping cycle or bottoming cycle, or to effectively provide a combined heat and power (CHP) energy conversion system.

For an example of one particularly useful area, waste heat is an enormous and largely untapped source of low-cost energy. More than half of the energy produced in the world escapes into the atmosphere in the form of waste heat. With global energy usage projected to increase by nearly 50% by 2040, and electricity demand expected to grow by nearly 70% within the same timeframe, the magnitude of the waste heat problem is compounding. The subject technology addresses this challenge. A typical industrial-scale waste heat environment may have temperatures in the 600° C. to 1400° C. range.

The subject technology provides a compact, modular system design that is easily retrofitted into the waste heat streams of existing industrial infrastructure without compromising upstream processes. Thanks to a small footprint, micron-gap thermophotovoltaic panel assemblies in accordance with the subject disclosure provide an ideal form for installation into the production facilities of some of the world's largest industries such as oil and gas exploration, petrochemicals, and chemical processing, as well as glass, steel, and cement manufacturing. The micron-gap thermophotovoltaic panel assemblies can provide industrial plants with on-site electricity while reducing grid power consumption and cost.

Figure 15:
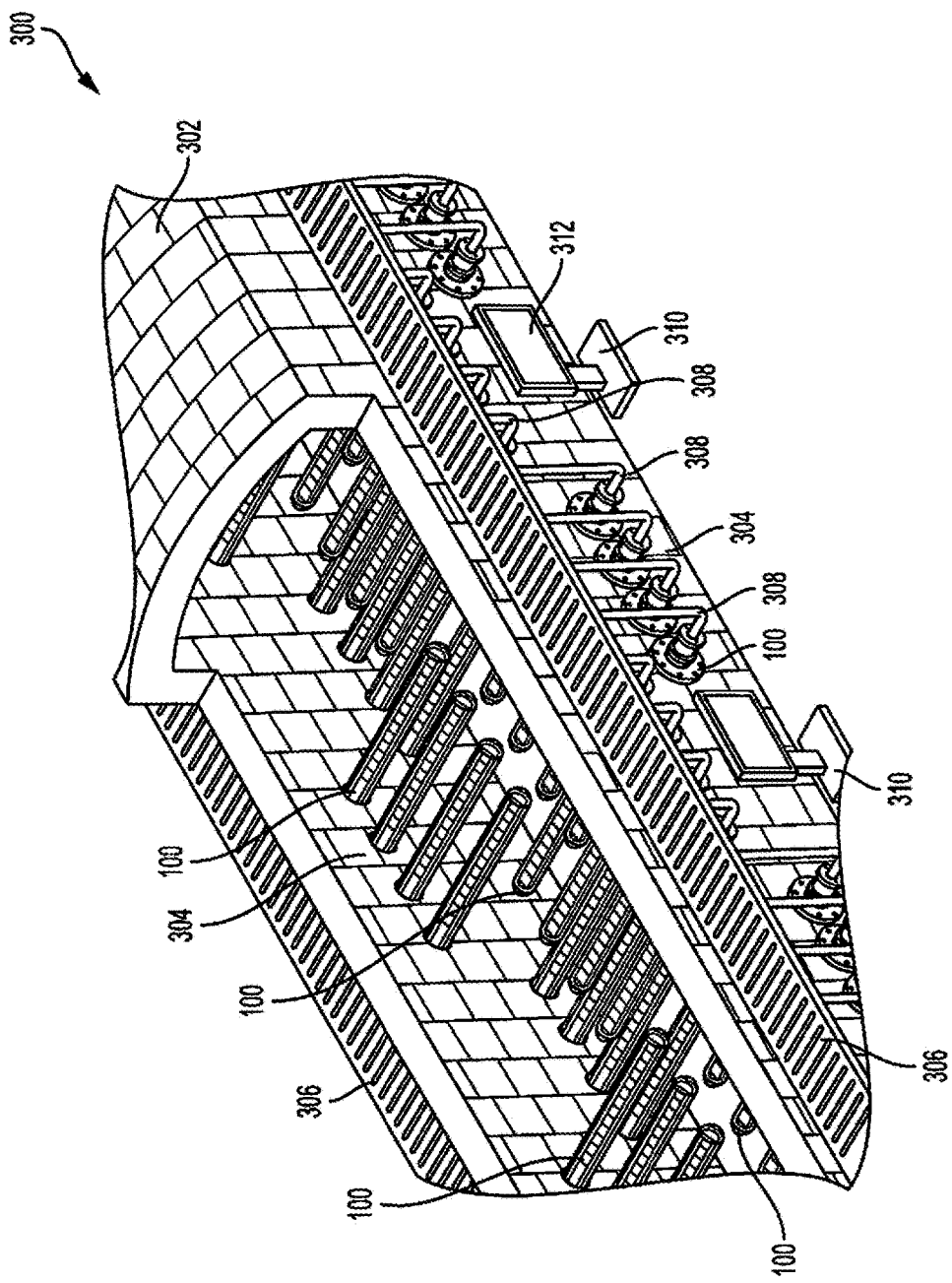
FIG. 15 is an industrial glass furnace application having micron-gap thermophotovoltaic panel assemblies in accordance with the subject technology is shown.

Referring now to FIG. 15, an industrial glass furnace application 300 having micron-gap thermophotovoltaic panel assemblies 100 in accordance with the subject technology is shown. The application 300 has a flue assembly 302 for conveying hot exhaust gases. The flue 302 is shown in partial cross-section to illustrate the micron-gap thermophotovoltaic panel assemblies 100 therein. As described above, the micron-gap thermophotovoltaic panel assemblies 100 are mounted through ports in walls 304 of the flue assembly 302. A raised walkway 306 serves the dual purpose of conduit support system. The walkway 306 may support utility lines such as a cooling fluid system that supplies cooling fluid via conduits 308 for the assemblies 100. The walkway 306 may also support vacuum lines, monitoring lines, diagnostic lines, communication lines, electrical lines and the like. Users can monitor and/or operate the micron-gap thermophotovoltaic panel assemblies 100 at one or more stations 310. The stations 310 have screens 312 to allow easy operational review and interaction with the micron-gap thermophotovoltaic panel assemblies 100. Alternatively, the micron-gap thermophotovoltaic panel assemblies 100 may be monitored and/or operated remotely.

Such waste heat environments enable heat-to-power production based on a plant-specific combination of exhaust flue gas temperatures, composition and mass flow rates. A furnace used to manufacture glass typically produces between 800° C. to 1400° C. exhaust gases at the thermal rate of 17 mBTU per hour. As many as 20 or more sets of micron-gap thermophotovoltaic panel assemblies 100 can be placed per flue, and with two flues per furnace, the power output from each glass furnace can be to 200 kW to 1 MW or more. This power would offset up to $600,000 in annual electricity expense at the U.S. average industrial cost of $0.07 per kilowatt-hour. Savings are significantly greater in high cost locations such as California (13.6 c/kWh), Germany (15.5 c/kWh) and Italy (26 c/kWh).

Figure 19:
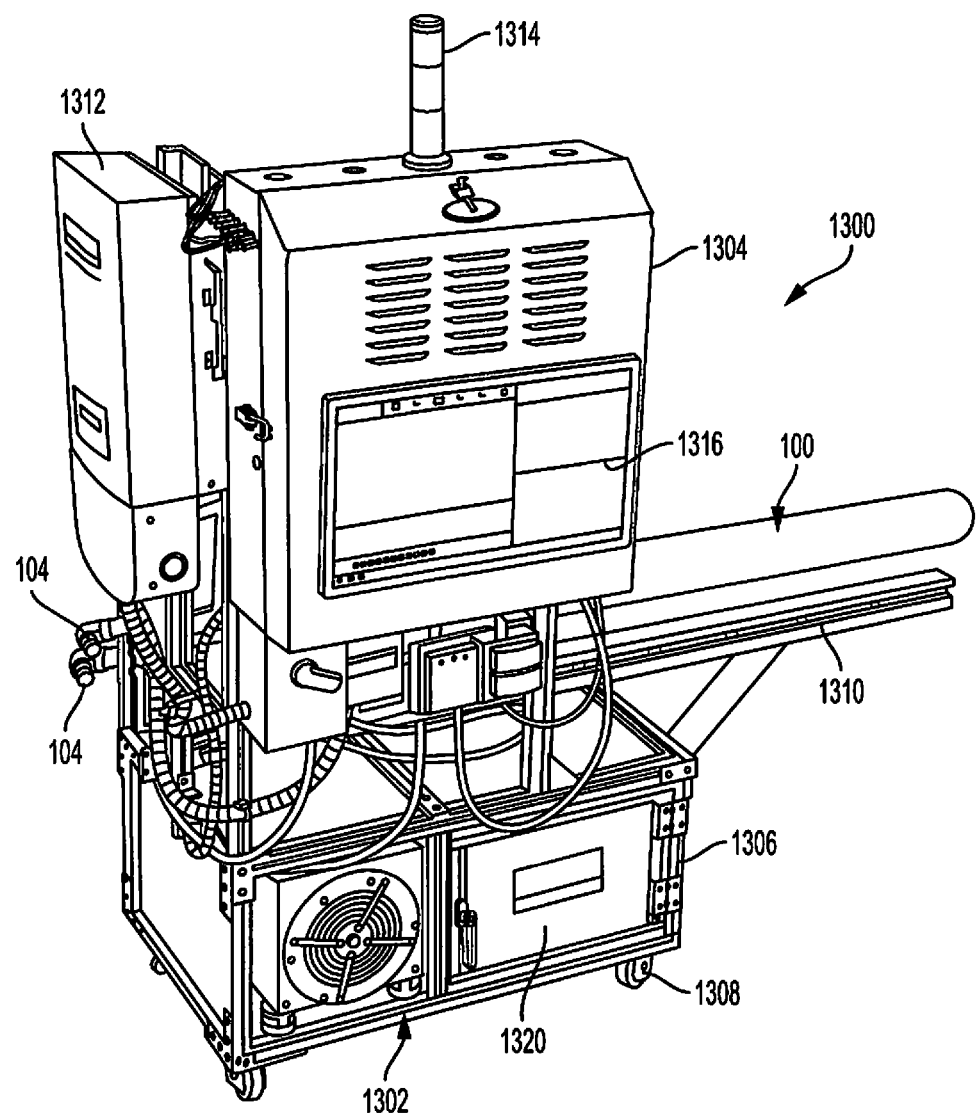
FIG. 19 is a rear perspective view of a portable diagnostic tool in accordance with the subject technology.

Referring now to FIG. 19, a rear perspective view of a portable diagnostic tool 1300 in accordance with the subject technology is shown. The portable diagnostic tool 1300 can easily evaluate production of power from waste heat environments. The portable diagnostic tool 1300 includes a thermophotovoltaic panel assembly 100 on a mounting system 1302. The mounting system 1302 can be easily shipped by traditional methods, preferably without disassembly or assembly. In another embodiment, the portable diagnostic system is partially disassembled for shipment. In still another embodiment, protruding components may be rotated into upright positions by means of mounted hinges for shipment. The mounting system 1302 is easily moved to a desired location for selective insertion of the thermophotovoltaic panel assembly into a waste heat environment. A control unit 1304 is also on the mounting system for controlling operation of the thermophotovoltaic panel assembly 100.

The mounting system 1302 includes a base structure 1306 for mounting components thereto. Locking swivel casters 1308 on the base structure 1306 let the portable diagnostic tool 1300 roll and be locked in place easily. The base structure 1306 has a rail system 1310 for selectively moving the thermophotovoltaic panel assembly 100 along an axis. Preferably, a height of the thermophotovoltaic panel assembly 100 can also be adjusted. The base structure 1306 also includes a vacuum system for providing vacuum to the thermophotovoltaic panel assembly 100. As the vacuum system has a significant weight, the vacuum system may be placed or movable to act as a counter-balance during extension of the thermophotovoltaic panel assembly. The base structure 1306 includes a storage unit 1320 for holding maintenance supplies, servicing tools, protective gowns and shields, burn kits and the like.

The base structure 1306 also has a cooling unit for providing cooling fluid to the thermophotovoltaic panel assembly 100. Alternatively, cooling can be by means of external sources, such as those provided by infrastructure (e.g., water, plumbing, HVAC, cooling towers and the like) or by natural sources (e.g., geothermal cooling, rivers, streams, oceans, air, etc). The portable diagnostic tool 1300 has electrical and other utility hookups, cables, hoses and connectors as needed to interface with on-site utilities for fast and easy connection. In one embodiment, the on-board cooling system includes a large coolant fluid reservoir, a pump and a heat exchanger. As such, the cooling system has a significant weight that is placed or movable to act as a counter-balance during extension of the thermophotovoltaic panel assembly. Other components of the portable diagnostic unit 1300 may also help to act as counter-balance.

The portable diagnostic unit 1300 also has an inverter 1312. The inverter 1312 may be detachable and mated to the portable diagnostic unit 1300 by a purpose-built cable connection. Similarly, the control unit 1304 and other components may be detachable. By being able to reduce the components, the portable diagnostic unit 1300 can be deployed in more diverse environments. The overall size, height and/or weight can also be reduced.

The control unit 1304 governs operation of the thermophotovoltaic panel assembly 100 and other components of the portable diagnostic tool 1300 such as the rail system 1310 if motorized. The control unit 1304 has a visual warning "light stack" or "stack indicator" or "indicator light" 1314 and video recording/monitoring equipment 1316. Depending upon needs, the control unit 1304 may also have a UPS backup unit, a data acquisition module, and a remote access module for operation via a smartphone application and the like.

In one embodiment, the control unit 1304 is a specialized application-specific hardware design. The control unit 1304 typically includes a central processing unit including one or more micro-processors, random access memory (RAM), mechanisms and structures for performing I/O operations (not shown), a storage medium such as a magnetic hard disk drive(s), a device for reading from and/or writing to removable computer readable media and an operating system for execution on the central processing unit. According to one embodiment, the hard disk drive of the control unit 1304 performs booting and storing the operating system, other applications or systems that are to be executed, paging and swapping between the hard disk and the RAM and the like. In one embodiment, the application programs reside on the hard disk drive for performing the functions in accordance with the subject technology. In another embodiment, the control unit 1304 has a browser for accessing an application hosted within a distributed computing network such as a local-area network or the Internet. The control unit 1304 can also utilize a removable computer readable medium such as a CD or DVD type of media that is inserted therein for reading and/or writing to the removable computer readable media. In other embodiments, controls are achieved by a simple programmable logic controller (PLC) with or without communications capabilities for SCADA (supervisory control and data acquisition).

The control unit 1304 has an input device(s) as is known to those skilled in the art which can be used to provide input signals for control of applications programs and other programs such as the operating system being executed on the control unit 1304. In illustrative embodiments, the input device preferably comprises a switch, a slide, a mouse, a track ball, a glide point or a joystick, a microphone or other such device (e.g., a keyboard having an integrally mounted glide point or mouse) by which a user such as a consumer can input control signals and other commands. Although the use of a keyboard and/or touchscreen as an input device is not described further herein, it is within the scope of the present disclosure for the input device to comprise any of a number of keyboards and touchscreens known to those skilled in the art, wherein the control signals or commands for implementing and interacting with the user and the applications program embodying such methodology can be implemented in the form of discrete commands via keyboard or touchscreen.

The control unit 1304 has a display(s) as would be appreciated by those of ordinary skill in the pertinent art. The display may be any of a number of devices known to those skilled in the art for displaying images responsive to outputs signals from the computers 14, 16. Such devices include but are not limited to cathode ray tubes (CRT), liquid crystal displays (LCDS), plasma screens and the like. Although a simplified diagram is illustrated in FIG. 19 such illustration shall not be construed as limiting the present disclosure to the illustrated embodiment. It should be recognized that the signals being output from the control unit 1304 can originate from any of a number of devices including PCI or AGP video boards or cards mounted within a housing of the control unit 1304 that are operably coupled to the microprocessors and the displays of the control unit 1304.

In operation, the portable diagnostic unit 1300 has a thermophotovoltaic panel assembly so that various locations can be tested for suitability of a more permanent installation of a thermophotovoltaic panel assembly to generate electricity from heat. In one embodiment, four connections are needed (e.g., 208 30 amp power circuit; 208 30 amp power circuit to connect the inverter to the grid; 110 power circuit for the monitoring system; and water supply). All connections and equipment are nema rated and UL compliant. For example, several locations in a waste heat environment may be suitable for generating electricity. Access in the various locations can be created (e.g., by creation of multiple holes for insertion of the thermophotovoltaic panel assembly). One or more portable diagnostic units 1300 can be shipped to the site and set up in each possible location for a period of time. The portable diagnostic units 1300 will collect all the relevant data for analysis of the location's suitability and profitability so that an informed decision can be made as to the number and placement of permanently installed thermophotovoltaic panel assemblies. The control unit may also, in part or in whole, be used on permanent installations. For example, while monitoring operation, the control unit 1304 may use a motorized rail system to automatically retract the thermophotovoltaic panel assembly from the waste heat environment when a predetermined condition is met such as an over-temperature condition, which may indicate a failure of the cooling system. The control unit controls a speed of insertion and a speed of extraction in order to manage the thermal shock depending upon the thermal shock profile of the assembly.

It is envisioned that a motorized rail system can also be used to control insertion of the permanent thermophotovoltaic panel assemblies into the heated zone. The motorized actuator may be a linear actuator driven by a lead screw or ball screw or acme thread, although any type of rail (e.g., round, magnetic, rack & pinion etc.) can be used. The drive mechanism could also be any type such as a hydraulic cylinder, a pneumatic cylinder, a pneumatic motor, hand-cranked gears, and the like.

The control unit may also provide alerts to designated recipients based on customizable alarm parameters, by means of the Internet, phone, cellular, Bluetooth or similar communication protocol. As is typical in dynamic system controls, the control unit can receive input from a myriad of sensors to monitor various temperatures (e.g., ambient, controls, furnace, cooling water, vacuum motor, system internals, inverter, and the like), pressures (e.g., system vacuum, ambient pressure, cooling fluid pressure, and the like), flow rates (e.g., air evacuation, cooling water), and any other digital or analog sensors common to those skilled in the art of system controls. In one embodiment, the control unit includes a programmable logic controller (PLC) that uses thermocouples, resistance temperature detectors (RTDs), current signals (0-20 mA, 4-20 mA, etc), voltage signals (0-10 VDC, for only one example), serial communication of any protocol (i.e. RS-232, RS-485, USB, MODBUS, etc.) and input/output relays for trigger system actions. A typical system may have an inverter to directly place power on the grid, and that power generation can be monitored directly by means of third party hardware and software (as is commonly built into an inverter), or by means of aforementioned signals through instruments such as a hall-effect sensor for monitoring DC current.

In other embodiments, off-grid power is generated and stored in batteries using a typical balance of systems, such as a charge controller (with or without maximum power point tracking) and a battery bank. These systems may use their own produced power to operate, rather than relying on an uninterruptible power supply (UPS) or grid power connection. The storage means may be part of the portable diagnostic unit or a separate assembly.

The portable diagnostic unit can also serve to evaluate various features in real world conditions. For example, various configurations may perform differently in various environments. The portable diagnostic unit can have different thermophotovoltaic panel assemblies so that comparison between features can be performed in real-world conditions. In another embodiment, the cooling system is used as a heater or pre-heater of fluid for another application. It is also envisioned that the portable diagnostic unit could have a plurality of thermophotovoltaic panel assemblies. Several components could be modular so that, for example, two portable diagnostic units could have a single control unit and the like.

Figure 16A:
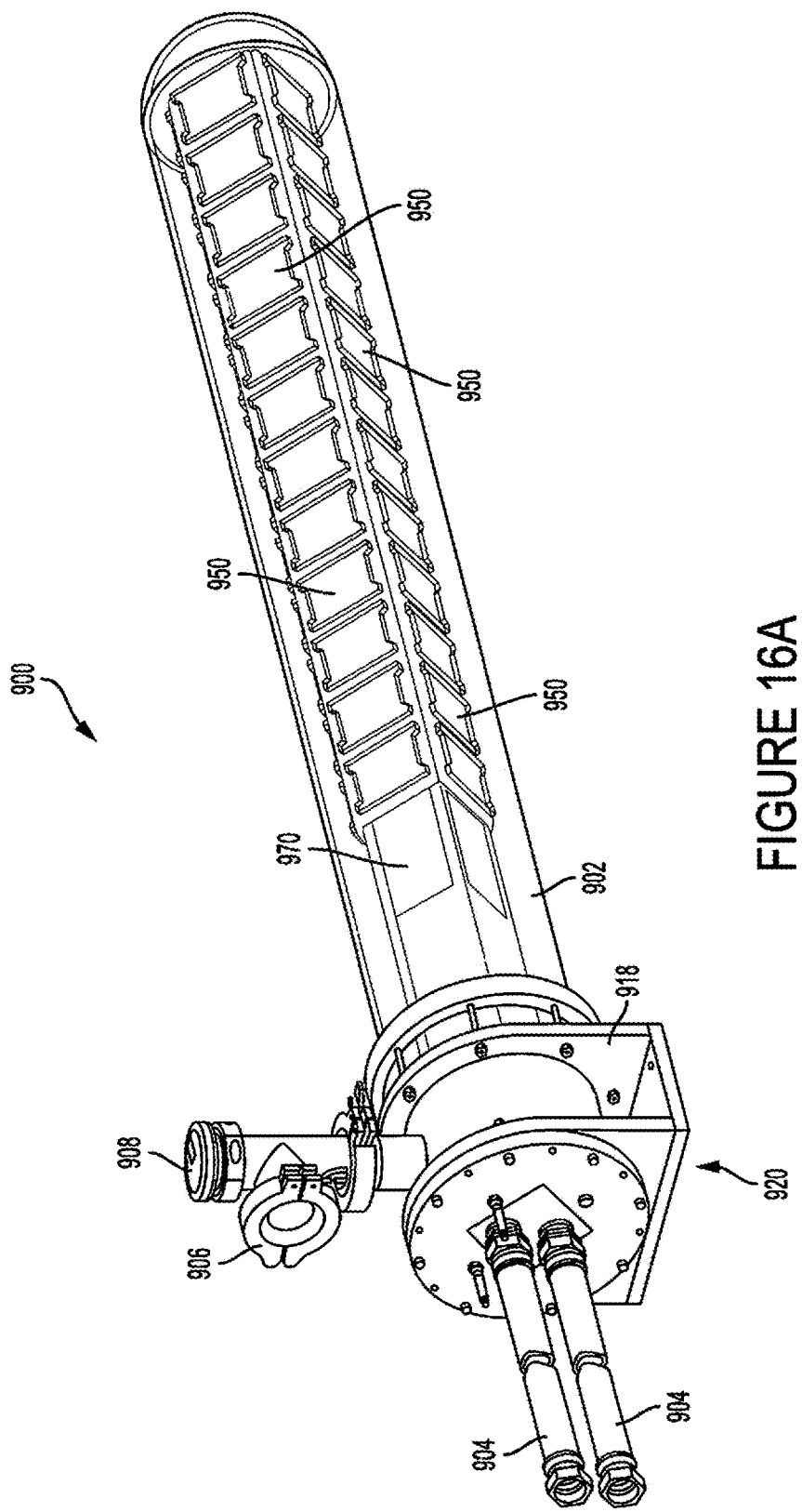
FIG. 16A is a perspective view of another micron-gap thermophotovoltaic panel assembly in accordance with the subject disclosure.

Referring now to FIG. 16A, a perspective view of another micron-gap thermophotovoltaic panel assembly 900 in accordance with the subject disclosure is shown. As will be appreciated by those of ordinary skill in the pertinent art, the micron-gap thermophotovoltaic panel assembly 900 utilizes similar principles to the micron-gap thermophotovoltaic panel assembly 100 described above. Accordingly, like reference numerals preceded by the numeral "9" instead of the numeral "1", are used to indicate like elements when possible. The following description is directed to the differences.

A difference of the micron-gap thermophotovoltaic panel assembly 900 is that the heat sink 970 is four-sided. In one embodiment, the heat sink 970 has forty-eight TPV modules 950 thereon, twelve being on each side. The heat sink 970 a cooling fin plate 971 (FIGS. 16B, 16F and 16G) on each side with twelve TPV modules 950 on each. It is also noted that the heat sink 970 is rotated approximately 45 degrees. The 45 degree orientation ensures that modules on all four sides of the heat sink receive radiation from the environment despite close packing of multiple assemblies 900. The housing 902 is drawn as translucent for purposes of illustration but may be transparent, opaque, semi-opaque or translucent.

Referring now to FIG. 16B, a partially exploded view of the distal end 972 of the heat sink 970 of the micron-gap thermophotovoltaic panel assembly 900 is shown. In particular, one TPV module 950 is shown disconnected from the heat sink 970. The TPV module 950 has a relatively thicker base substrate 960 for increased stiffness and the mounting holes 962 for the screws 966 are relocated. It is noted that the number of mounting holes 962 is doubled to accommodate the additional screws 966. The force application layer 990 also has a different shape so that the mounting screws 994 are more closely positioned in the four corners of the generally square shape. It should be appreciated by those of ordinary skill in the pertinent art that the differences noted in the TPV module 950 can be applied to TPV modules disposed upon a two-sided or any-sided heat sink as the TPV module design is independent of the heat sink design.

Figure 16D:
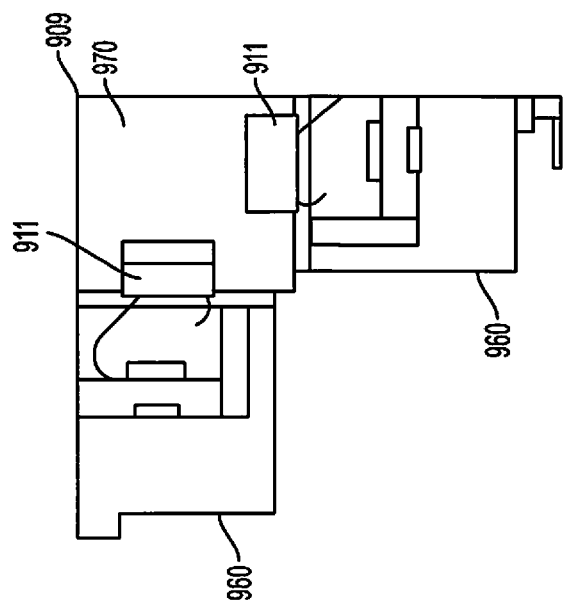
FIG. 16D is a cross-sectional view of an electrical busbar of the micron-gap thermophotovoltaic panel assembly of FIG. 16A.
Figure 16C:
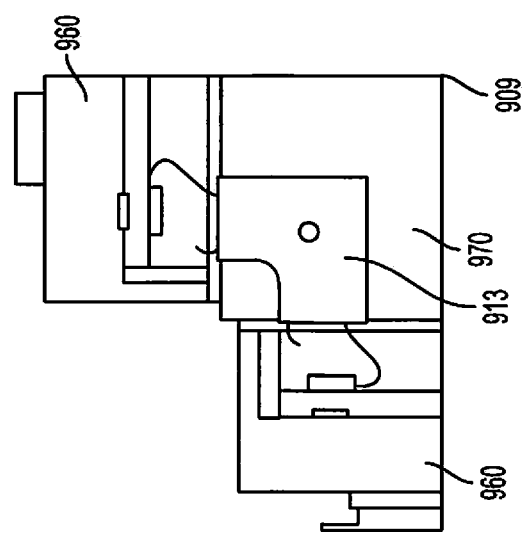
FIG. 16C is a cross-sectional view of a corner electrical jumper of the micron-gap thermophotovoltaic panel assembly of FIG. 16A.

One additional difference of the four-sided micron-gap thermophotovoltaic panel assembly 900 is that the electrical connections are embedded into the heat sink 970 as shown in FIGS. 16B-D. The heat sink 970 forms elongated slots 907 along a corner edge 909 thereof. As shown in cross-section in FIG. 16D, busbars 911 fit into the slots 907 for carrying voltage from the TPV modules 950.

Referring now 16C, a cross-sectional view of a corner electrical jumper 913 of the micron-gap thermophotovoltaic panel assembly 900 is shown. The corner electrical jumpers 913 electrically connect the TPV modules 950. In one embodiment, the corner electrical jumpers 913 connect four TPV modules 950 at the same point along the length of the heat sink 970 into a group. The corner electrical jumpers 913 may group other combinations of TPV modules 950 in a varied manner such as by forming a grouping of twelve. The busbars 911 and corner electrical jumpers 913 are preferably made of metal and support both low voltage (e.g., 10V) and high voltage (e.g., 50V) applications.

Figure 16E:
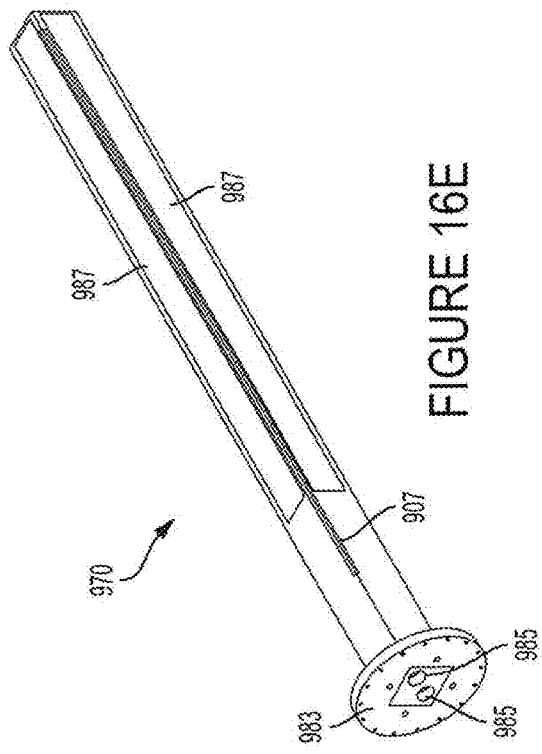
FIG. 16E is a perspective view of a heat sink of the micron-gap thermophotovoltaic panel assembly of FIG. 16A.

Referring now to FIG. 16E, a perspective view of the heat sink 970 of the micron-gap thermophotovoltaic panel assembly 900 is shown. The heat sink 970 has an integral back plate 983 with two relatively larger bores 985 for fluid ingress and egress. The larger bores 985 allow for higher flow and lower pressure drop of the cooling fluid. Preferably, the heat sink 970 is fabricated from high conductivity aluminum alloy, copper, steel and the like.

Figure 16F:
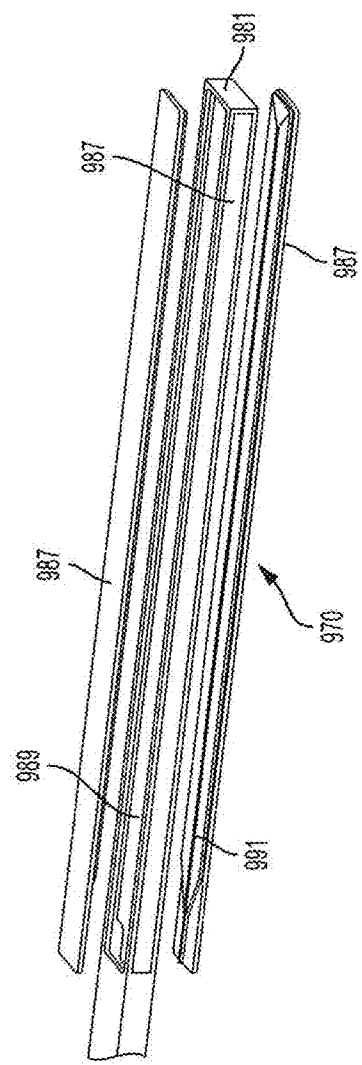
FIG. 16F is a partially exploded view of the heat sink of FIG. 16E.
Figure 16G:
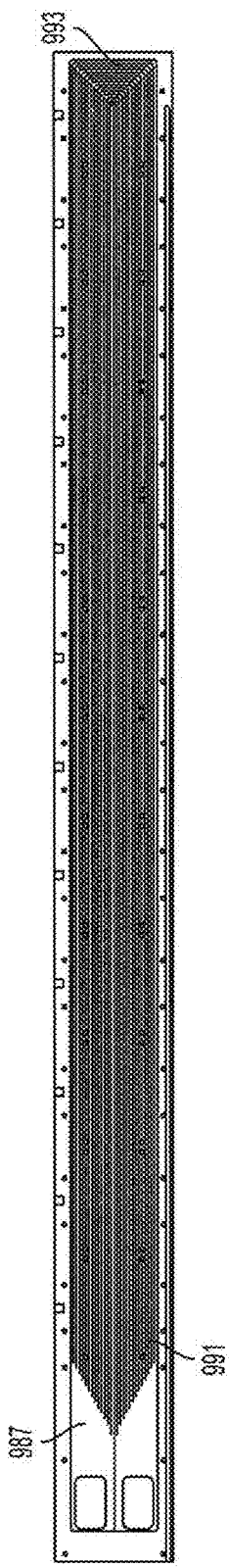
FIG. 16G is a plan view of a fin plate of the heat sink of FIG. 16E.
Figure 16H:
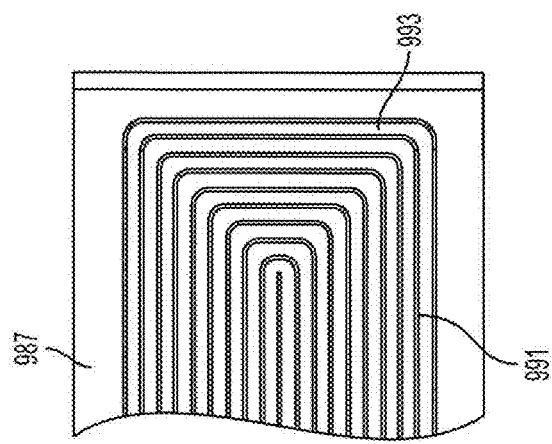
FIG. 16H is a detailed view of an end of the fin plate of the heat sink of FIG. 16E.
Figure 16I:
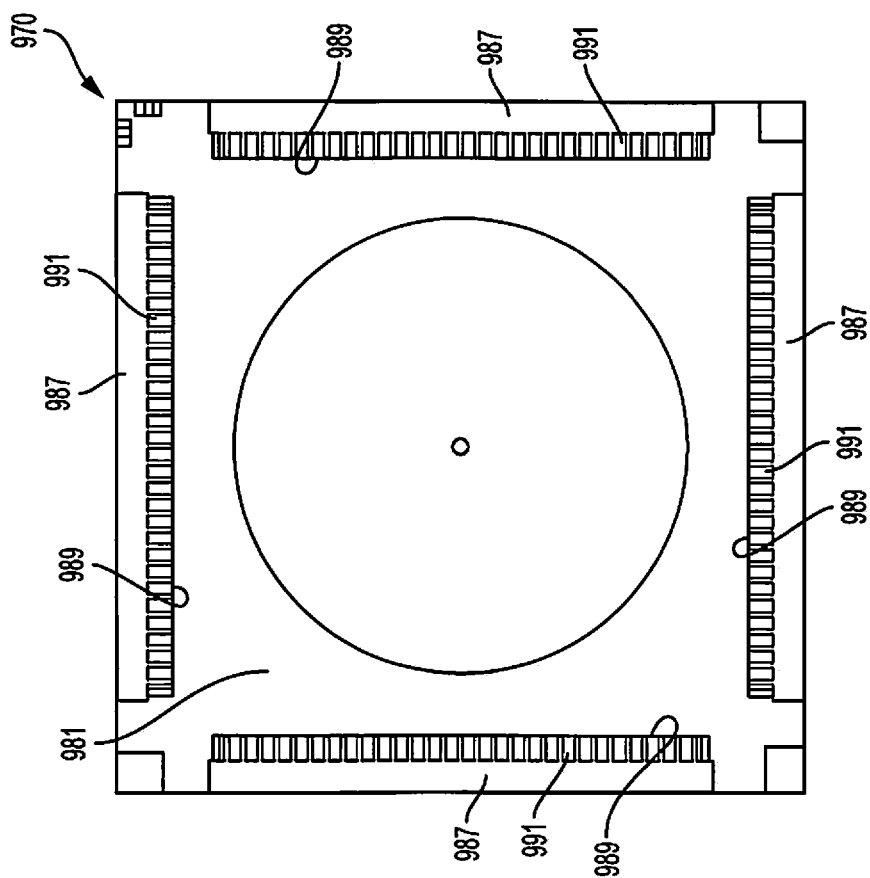
FIG. 16I is a cross-sectional view of the heat sink of FIG. 16E.

Referring additionally to FIG. 16F, a partially exploded view of the heat sink 970 is shown. The heat sink 970 includes a four-sided body 981 with a fin plate 987 on each side. Under each fin plate 987, the body 981 forms a large flow area 989 in fluid communication with the bores 985. Fins 991 extend from the fin plates 987 into the flow areas 989 to facilitate cooling of the heat sink 970 as best seen in FIGS. 16G and 16I. The fins 991 are generally a plurality of elongated ridges forming parallel channels therebetween. The ends 993 of the fins 991 form a race-track configuration as best seen in FIG. 16H.

Figure 17A:
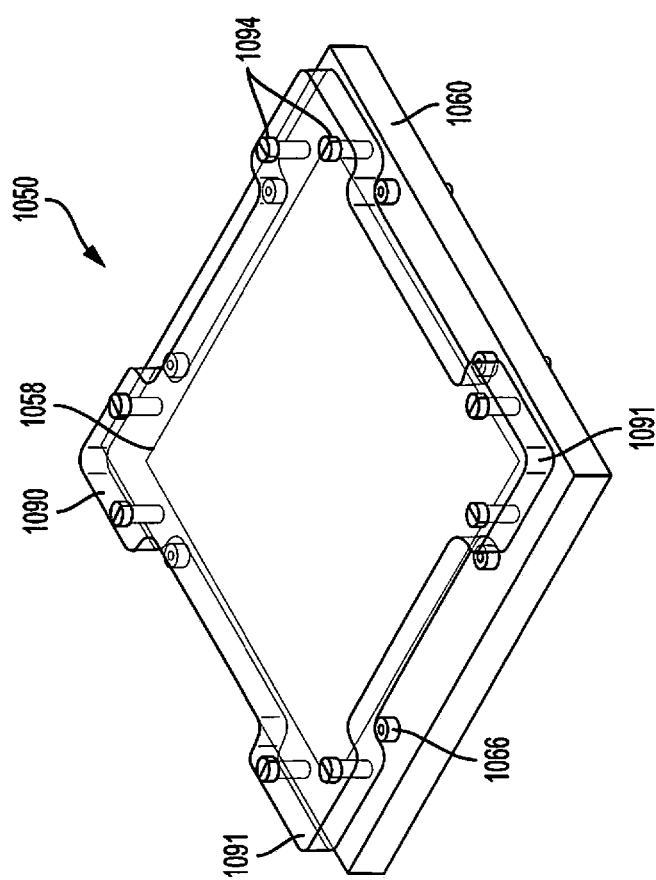
FIG. 17A is a top perspective view of another thermophotovoltaic (TPV) module in accordance with the subject disclosure.

Referring now to FIG. 17A, a top perspective view of another thermophotovoltaic (TPV) module 1050 in accordance with the subject disclosure is shown. As will be appreciated by those of ordinary skill in the pertinent art, the TPV module 1050 utilizes similar principles to the TPV modules 150, 950 described above. Accordingly, like reference numerals preceded by the "10" instead of the "1" or "9", are used to indicate like elements when possible.

A difference of the TPV module 1050 is that the shape of the force application layer 1090 and arrangement of the mounting screws 1094 has changed. The force application layer 1090 is substantially square but includes four enlarged corners 1091. The mounting screws 1094 are arranged in a substantially symmetric radial manner to reduce corner gap pull-away and evenly distribute pressure on thermal interfaces for improved cooling. In the embodiment shown, the mounting screws 1094 are arranged in opposing pairs in each corner 1091.

Figure 17B:
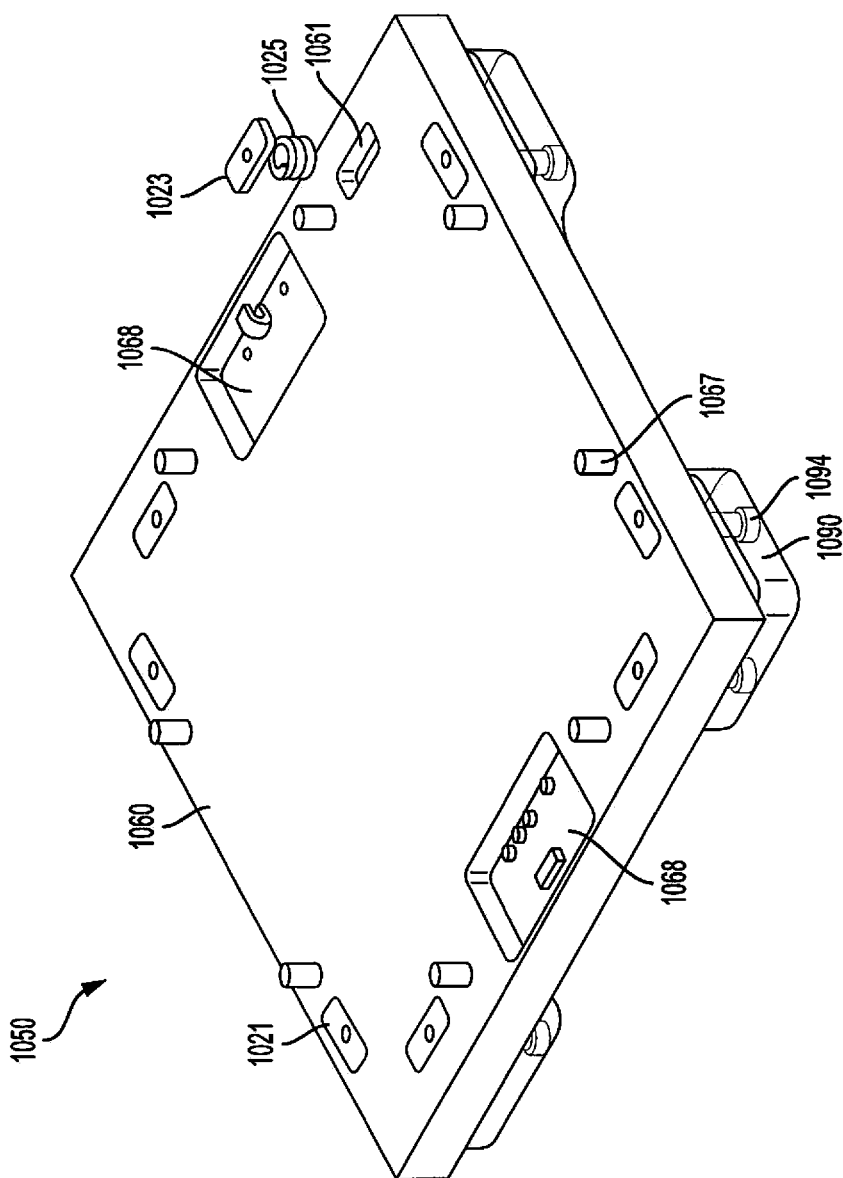
FIG. 17B is a bottom perspective view of the TPV module of FIG. 17A.

Referring now to FIG. 17B, a bottom perspective view of the TPV module 1050 is shown. The TPV module 1050 has mounting assemblies 1021 that couple to the mounting screws 1094. The base substrate 1060 forms recesses 1061 so that the mounting assemblies 1021 do not prevent good contact with the heat sink. The base substrate 1060 may also include mounting pins 1067 for positioning on the heat sink as well as recessed areas 1068 for electrical connections and the like.

Figure 17C:
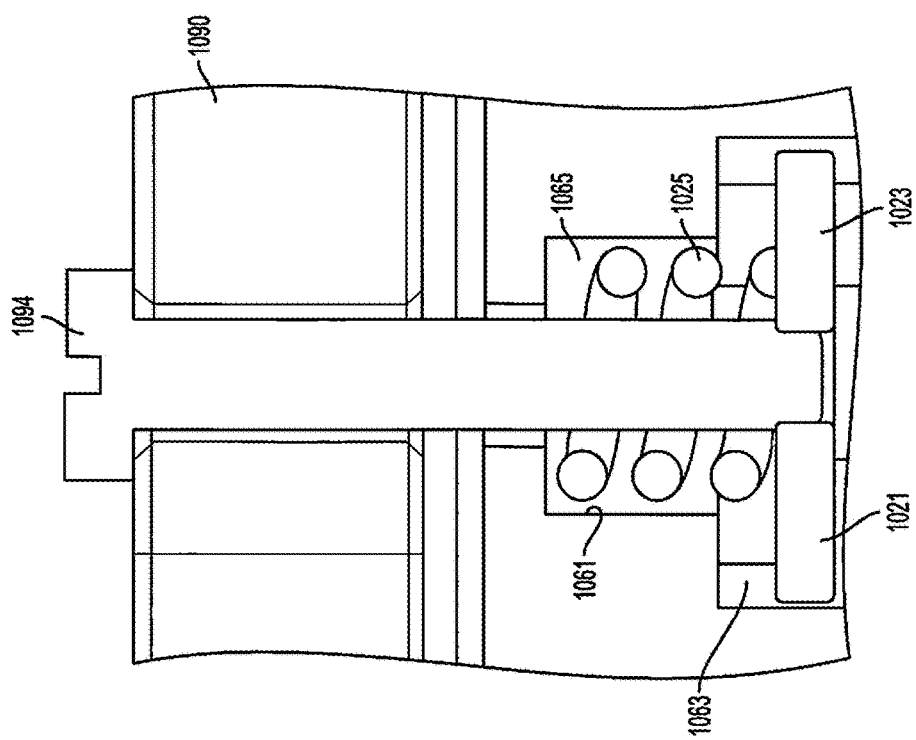
FIG. 17C is a cross-sectional view of a mounting assembly in the TPV module of FIGS. 17A and 17B.

One of the mounting assemblies 1021 is shown in exploded view. Each mounting assembly 1021 includes the mounting screw 1094, a nut 1023 and a spring 1025. The nut 1023 and recess 1061 are shaped so that the nut is captured by the recess when the mounting screw 1094 is turned. Referring to FIG. 17C, a cross-sectional view of an assembled mounting assembly 1021 is shown. The recess 1061 has an outer portion 1063 sized and configured to retain the nut 1023 in a set orientation. The recess 1061 also has an inner portion 1065 that is relatively more radially narrow. When assembled, the spring 1025 is retained in the inner portion 1065 by the nut 1023, which sits in the outer portion 1063. The screw 1094 passes through the spring 1025 and threadably couples to the nut 1023. The outer portion 1063 has sufficient depth so that the screw 1094 does not protrude. Further, the sufficient depth allows adjustment of the screws 1094 and, in turn, the gaps in the TPV module 1050 after the TPV is mounted to the heat sink. The force applied by application layer 1090 is provided by the compression of the springs 1025 working against the tension provided by the screws 1094 and nuts 1023.

Figure 18:
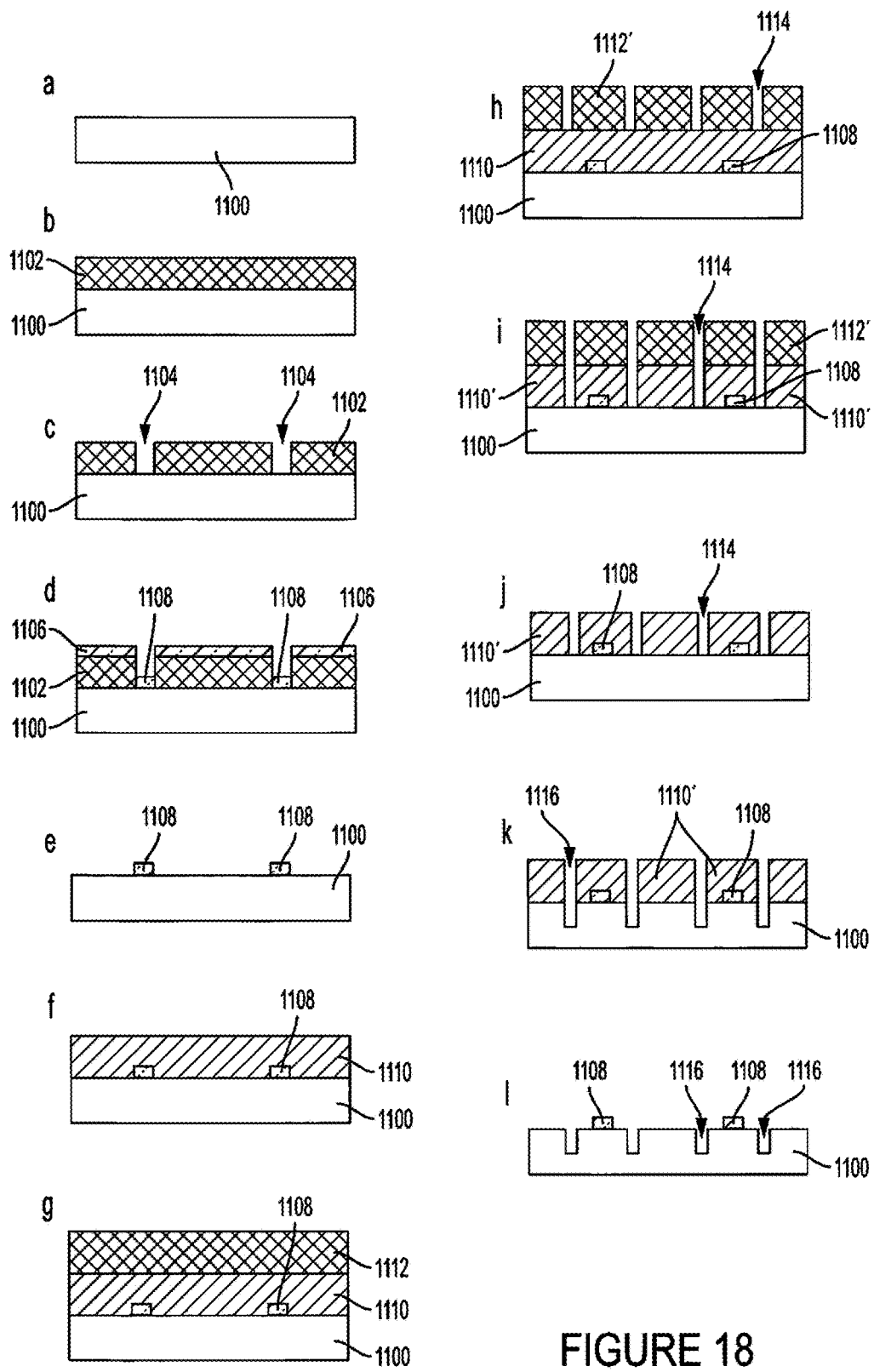
FIG. 18 is a series of cross-sectional views of various possible manufacturing steps to fabricate nano-gap spacers on a transparent or other substrate in accordance with the subject technology.

Referring now to FIG. 18, a series of cross-sectional views of various possible manufacturing steps "a-l" to fabricate nano-gap spacers on a transparent or other substrate in accordance with the subject technology are shown. In one embodiment, the substrate is a transparent emitter for a thermophotovoltaic module. Steps "a-l" may be performed by using known microlithography processes typical in the semiconductor industry. At step a, a bare substrate 1100 is provided. The bare substrate 1110 is coated with a photoresist layer 1102 at step b. The photoresist layer 1102 is patterned so that a plurality of holes 1104 are formed in step c. The holes 1104 may be any size and shape.

At step d, an oxide layer 1106 is deposited. As a result of the holes 1104, portions or spacers 1108 of the oxide layer 1106 are directly on the substrate 1100. By lifting off the photoresist layer 1102 with the oxide layer 1106 thereon, only the oxide spacers 1108 will remain on the substrate 1100 as shown in step e.

At step f, a metal mask layer 1110 is deposited over the spacers 1108 and substrate 1100. In order to pattern the metal mask layer 1110, photoresist 1112 is applied thereto as shown at step g. Once the photoresist 1112 is formed in the desired pattern to create patterned photoresist 1112' (step h) with holes 1114, the metal mask layer 1110 can be etched into the same pattern to form a patterned metal mask layer 1110' as shown at step i. As a result, the holes 1114 are formed through the photoresist 1112' and metal mask layer 1110' down to the substrate 1100. The metal mask layer can be made of any sufficiently robust masking material such as thick photoresist even. The metal mask layer should be robust against etching and other required processing steps used to pattern the substrate 1100, which can be quite aggressive. In one embodiment, the substrate 1100 is fused silica that is etched using reactive ion etching (RIE).

After removing the photoresist 1112' (step j), the substrate 1100 can be etched at the locations of the holes 1114 to form trenches 1116 in the substrate 1100 as shown in step k. Once the metal mask layer 1110' is removed, as shown in step l, the result is a substrate 1100 with spacers 1108 surrounded by trenches 1116 for improved spacer thermal resistance.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., heat sinks, cooling tubes, flanges, electrical connectors, interface layers, bolts, and the like) shown as distinct for purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims. For example, it is noted that the energy passed to the emitter may be radiated from the housing or the housing may simply pass through photons from the surrounding environment. Further, the claims may be rewritten so that a portion of a claim is recited in another claim as well as each claim may depend from any, some or all claims in a multiple dependent manner even though such has not been originally claimed.

What is claimed is:

1. A thermophotovoltaic panel assembly comprising:
a housing having an inner surface defining an interior and facilitating energy radiating into the interior;
an elongated heat sink;
a plurality of thermophotovoltaic modules mounted on the heat sink, each one of the plurality of thermophotovoltaic modules including:
a planar emitter assembly;
a planar photovoltaic assembly separated from the emitter assembly by a micron-gap;
a planar force application layer positioned on top of and covering the planar emitter assembly and opposing the planar photovoltaic assembly, wherein the planar force application layer evenly distributes force applied thereto;
a mounting bracket;
at least one support bar extending from the mounting bracket and coupling to the heat sink so that the heat sink is cantilevered into the interior to define the space between the plurality of thermophotovoltaic modules and the inner surface; and
a fastener applying a force to the planar force application layer to set and maintain the micron-gap,
wherein: the housing is configured for placement in a hot environment to protect the heat sink and the plurality of thermophotovoltaic modules; a space is defined between the inner surface of the housing and the plurality of thermophotovoltaic modules; and energy radiates to the emitter assembly and minimal energy from the hot environment passes by conduction or convection to the plurality of thermophotovoltaic modules.

2. A thermophotovoltaic panel assembly as recited in claim 1, wherein each emitter assembly of the plurality of thermophotovoltaic modules includes an emitter and each photovoltaic assembly of the plurality of thermophotovoltaic modules includes a photovoltaic element.

3. A thermophotovoltaic panel assembly as recited in claim 2, wherein each fastener of the plurality of thermophotovoltaic modules is a plurality of threaded bolts and the emitter of each emitter assembly of the plurality of thermophotovoltaic modules is bolted to the heat sink using the fastener.

4. A thermophotovoltaic panel assembly as recited in claim 1, further comprising a base substrate between each photovoltaic assembly of the plurality of thermophotovoltaic modules and the heat sink, wherein the base substrate is fabricated from a material having high thermal conductivity properties and each fastener of the plurality of thermophotovoltaic modules is at least one bolt extending through the force application layer to couple to the base substrate.

5. A thermophotovoltaic panel assembly as recited in claim 1, wherein the housing is tubular with a closed distal end and an open proximal end, and further comprising a flange surrounding the open proximal end for mounting the housing, and wherein the housing is mounted to the mounting bracket.

6. A thermophotovoltaic panel assembly as recited in claim 1, wherein:
the housing maintains a vacuum and, in turn, the micron-gap is evacuated;
the heat sink defines a passageway for receiving a cooling fluid pumped therethrough; and
the fastener is selected from the group consisting of: at least one bolt; at least one rivet; at least one staple; at least one clamp; at least one bond; and combinations thereof,
and further comprising a pressure relief valve between the housing and a vacuum source.

7. A thermophotovoltaic panel assembly as recited in claim 1, further comprising:
at least one support element between the heat sink and the inner surface so that the space is formed around the heat sink between the plurality of thermophotovoltaic modules and the inner surface.

8. A thermophotovoltaic panel assembly as recited in claim 1, further comprising:
a second housing having a second inner surface defining a second interior, wherein the first housing extends into the second interior for protecting the first housing.

9. A thermophotovoltaic panel assembly as recited in claim 8, wherein the second housing is mounted in a hot environment and further comprising a linear actuator for moving the first housing selectively into the second housing and, thereby, the plurality of thermophotovoltaic modules to a desired location in the hot environment.

10. A thermophotovoltaic panel assembly as recited in claim 1, wherein the housing is fixed in place in a hot environment; and further comprising:
a linear actuator for moving the plurality of thermophotovoltaic modules to a desired location within the housing.

11. A thermophotovoltaic panel assembly as recited in claim 1, wherein the heat sink comprises opposing top and bottom surfaces and a sidewall extending between the top and bottom surfaces, the sidewall defining a recess for passage of electrical wires; and wherein at least one of the plurality of thermophotovoltaic modules is mounted on a distal end of the heat sink on each of the opposing top and bottom surfaces.

12. A thermophotovoltaic panel assembly as recited in claim 1, further comprising a plurality of sub-micron-sized spacers between each planar emitter assembly and photovoltaic assembly of the plurality of thermophotovoltaic modules for setting the micron-gap, wherein the force is a compressive force bringing each planar emitter assembly and photovoltaic assembly of the plurality of thermophotovoltaic modules together.

* * * * *